(12) United States Patent
Chandra

(10) Patent No.: US 7,472,363 B1
(45) Date of Patent: Dec. 30, 2008

(54) SEMICONDUCTOR CHIP DESIGN HAVING THERMAL AWARENESS ACROSS MULTIPLE SUB-SYSTEM DOMAINS

(75) Inventor: Rajit Chandra, Cupertino, CA (US)

(73) Assignee: Gradient Design Automation Inc., Santa Clara, CA (US)

( * ) Notice: Subject to any disclaimer, the term of this patent is extended or adjusted under 35 U.S.C. 154(b) by 178 days.

(21) Appl. No.: 11/317,668

(22) Filed: Dec. 23, 2005

Related U.S. Application Data

(63) Continuation-in-part of application No. 11/180,353, filed on Jul. 13, 2005, now Pat. No. 7,401,304, which is a continuation-in-part of application No. 11/039,737, filed on Jan. 20, 2005, now Pat. No. 7,203,920, and a continuation-in-part of application No. 10/979,957, filed on Nov. 3, 2004, now Pat. No. 7,194,711, application No. 11/317,668, which is a continuation-in-part of application No. 11/215,783, filed on Aug. 29, 2005, and a continuation-in-part of application No. 11/198,470, filed on Aug. 5, 2005, now Pat. No. 7,353,471, and a continuation-in-part of application No. 11/198,467, filed on Aug. 5, 2005, now Pat. No. 7,383,520, and a continuation-in-part of application No. 11/078,047, filed on Mar. 11, 2005, now Pat. No. 7,191,413.

(60) Provisional application No. 60/751,376, filed on Dec. 17, 2005, provisional application No. 60/734,372, filed on Nov. 7, 2005, provisional application No. 60/718,138, filed on Sep. 16, 2005, provisional application No. 60/587,313, filed on Jul. 13, 2004, provisional application No. 60/599,098, filed on Aug. 5, 2004, provisional application No. 60/539,727, filed on Jan. 28, 2004, provisional application No. 60/599,278, filed on Aug. 5, 2004, provisional application No. 60/598,957, filed on Aug. 5, 2004, provisional application No. 60/605,889, filed on Aug. 30, 2004, provisional application No. 60/689,592, filed on Jun. 10, 2005, provisional application No. 60/552,375, filed on Mar. 11, 2004, provisional application No. 60/658,323, filed on Mar. 3, 2005, provisional application No. 60/658,324, filed on Mar. 3, 2005, provisional application No. 60/539,727, filed on Jan. 28, 2004.

(51) Int. Cl.
*G06F 17/50* (2006.01)
(52) U.S. Cl. .............................................. 716/5; 716/4
(58) Field of Classification Search ................. 716/1, 716/2, 4, 5
See application file for complete search history.

(56) References Cited

U.S. PATENT DOCUMENTS

| | | |
|---|---|---|
| 4,696,578 A | 9/1987 | Mansuria et al. |
| 5,654,904 A | 8/1997 | Thakur |
| 5,710,068 A * | 1/1998 | Hill ........................... 437/171 |
| 5,831,249 A | 11/1998 | Rohner et al. |
| 5,838,578 A | 11/1998 | Pippin |
| 5,927,853 A | 7/1999 | Christiaens et al. |
| 5,997,174 A | 12/1999 | Wyland |
| 6,124,635 A | 9/2000 | Kuwabara et al. |
| 6,172,337 B1 | 1/2001 | Johnsgard et al. |
| 6,203,191 B1 | 3/2001 | Mongan |
| 6,247,161 B1 * | 6/2001 | Lambrecht et al. ............. 716/1 |
| 6,320,201 B1 | 11/2001 | Corbett et al. |
| 6,334,013 B1 | 12/2001 | Laming et al. |
| 6,389,582 B1 * | 5/2002 | Valainis et al. .................. 716/9 |
| 6,505,326 B1 | 1/2003 | Farral et al. |
| 6,532,570 B1 * | 3/2003 | Mau .............................. 716/2 |
| 6,591,399 B1 | 7/2003 | Wyrzykowska et al. |
| 6,591,402 B1 | 7/2003 | Chandra et al. |
| 6,634,013 B2 | 10/2003 | Shinzawa |
| 6,662,345 B2 * | 12/2003 | Uchida et al. ................... 716/1 |
| 6,751,781 B2 | 6/2004 | Lin et al. |
| 6,769,102 B2 | 7/2004 | Frank et al. |
| 6,931,369 B1 * | 8/2005 | Perry et al. .................... 703/18 |
| 6,993,742 B2 | 1/2006 | Fryer et al. |
| 7,025,280 B2 | 4/2006 | Kaushal et al. |
| 7,039,888 B2 | 5/2006 | Steinmann et al. |
| 7,096,450 B2 * | 8/2006 | Gill et al. ...................... 716/15 |
| 7,162,402 B2 * | 1/2007 | Daems et al. .................. 703/13 |
| 7,171,346 B1 * | 1/2007 | Recker et al. .................. 703/14 |
| 7,191,112 B2 * | 3/2007 | Demler et al. ................. 703/14 |

| | | | |
|---|---|---|---|
| 7,191,413 B2 | 3/2007 | Chandra et al. | |
| 7,194,711 B2 | 3/2007 | Chandra | |
| 7,203,920 B2 | 4/2007 | Chandra | |
| 7,263,477 B2* | 8/2007 | Chen et al. | 703/13 |
| 7,353,471 B1 | 4/2008 | Chandra et al. | |
| 7,383,520 B2 | 6/2008 | Chandra | |
| 7,401,304 B2 | 7/2008 | Li et al. | |
| 2001/0032330 A1* | 10/2001 | Kusunoki | 716/8 |
| 2002/0050833 A1 | 5/2002 | Jones et al. | |
| 2003/0145296 A1 | 7/2003 | Chandra et al. | |
| 2003/0226122 A1* | 12/2003 | Hathaway et al. | 716/2 |
| 2005/0044515 A1* | 2/2005 | Acar et al. | 716/5 |
| 2005/0058178 A1 | 3/2005 | Shih et al. | |
| 2005/0138581 A1* | 6/2005 | Usui | 716/4 |
| 2005/0149886 A1 | 7/2005 | Kaushal et al. | |
| 2005/0155004 A1 | 7/2005 | Miura et al. | |
| 2005/0166166 A1* | 7/2005 | Chandra et al. | 716/4 |
| 2005/0166168 A1 | 7/2005 | Chandra | |
| 2005/0210425 A1* | 9/2005 | Keller et al. | 716/4 |
| 2006/0031794 A1* | 2/2006 | Li et al. | 716/4 |
| 2007/0120239 A1 | 5/2007 | Chandra | |
| 2007/0157137 A1* | 7/2007 | Chandra | 716/4 |

FOREIGN PATENT DOCUMENTS

| | | |
|---|---|---|
| WO | 2007/019531 A2 | 2/2007 |
| WO | 2007/070879 A1 | 6/2007 |

OTHER PUBLICATIONS

The International Technology Roadmap for Semiconductors, 2003 Edition, Executive Summary, published by the Semiconductor Industry Association et al., 2003; 75 pages.
The International Technology Roadmap for Semiconductors, 2003 Edition, System Drivers, published by the Semiconductor Industry Association et al., 2003; 24 pages.
The International Technology Roadmap for Semiconductors, 2003 Edition, Design, published by the Semiconductor Industry Association et al., 2003; 43 pages.
The International Technology Roadmap for Semiconductors, 2003 Edition, Test and Test Equipment, published by the Semiconductor Industry Association et al., 2003; 63 pages.
The International Technology Roadmap for Semiconductors, 2003 Edition, Process Integration, Devices and Structures; Includes RF and Analog/Mixed-Signal Technologies for Wireless Communications and Emerging Research Devices, published by the Semiconductor Industry Association et al., 2003; 41 pages.
The International Technology Roadmap for Semiconductors, 2003 Edition, Radio Frequency and Analog/Mixed-Signal Technologies for Wireless Communications [A Section of the Process Integration Chapter], published by the Semiconductor Industry Association et al., 2003; 40 pages.
The International Technology Roadmap for Semiconductors, 2003 Edition, Emerging Research Devices, published by the Semiconductor Industry Association et al., 2003; 53 pages.
The International Technology Roadmap for Semiconductors, 2003 Edition, Front End Processes, published by the Semiconductor Industry Association et al., 2003; 62 pages.
The International Technology Roadmap for Semiconductors, 2003 Edition, Lithography, published by the Semiconductor Industry Association et al., 2003; 20 pages.
The International Technology Roadmap for Semiconductors, 2003 Edition, Interconnect, published by the Semiconductor Industry Association et al., 2003; 45 pages.
The International Technology Roadmap for Semiconductors, 2003 Edition, Factory Integration, published by the Semiconductor Industry Association et al., 2003; 42 pages.
The International Technology Roadmap for Semiconductors, 2003 Edition, Assembly and Packaging, published by the Semiconductor Industry Association et al., 2003; 24 pages.
The International Technology Roadmap for Semiconductors, 2003 Edition, Environment, Safety, and Health, published by the Semiconductor Industry Association et al., 2003; 27 pages.
The International Technology Roadmap for Semiconductors, 2003 Edition, Yield Enhancement, published by the Semiconductor Industry Association et al., 2003; 39 pages.
The International Technology Roadmap for Semiconductors, 2003 Edition, Metrology, published by the Semiconductor Industry Association et al., 2003; 40 pages.
The International Technology Roadmap for Semiconductors, 2003 Edition, Modeling and Simulation, published by the Semiconductor Industry Association et al., 2003; 27 pages.
Yi-Kan Cheng, Prasun Raha, Chin-Chi Teng, Elyse Rosenbaum, Sung-Mo Kang; Illiads-T: An Electrothermal Timing Simulator for Temperature-Sensitive Reliability Diagnosis of CMOS VLSI Chips; IEEE Transactions on Computer-Aided Design of Integrated Circuits and Systems, vol. 17, No. 8, Aug. 1998, pp. 668-681.
Sven Rzepka, Kaustav Banerjee, Ekkehard Meusel, and Chenming Hu; Characterization of Self-Heating in Advanced VLSI Interconnect Lines Based on Thermal Finite Element Simulation; IEEE Transactions on Components, Packaging, and Manufacturing Technology—Part A, vol. 21, No. 3, Sep. 1998, pp. 406-411.
Yi-Kan Cheng, Ching-Han Tsai, Chin-Chi Teng, Elyse Rosenbaum, Sung-Mo (Steve) Kang; Electrothermal Analysis of VLSI Systems; Kluwer Academic Publishers, 2000, 116 pages.
Kaustav Banerjee, Amit Mehrotra, Alberto Sangiovanni-Vincentelli, Chenming Hu; On Thermal Effects in Deep Sub-Micron VLSI Interconnects; Proceedings of IEEE/ACM DAC 1999, pp. 885-891.
Ting-Yen Chiang, Kaustav Banerjee, Krishna C. Saraswat; Comact Modeling and Spice-Based Simulation for Electrothermal Analysis of Multilevel ULSI Interconnects; Proceedings of IEEE/ACM ICCAD, 2001, pp. 165-172.
Zhiping Yu, Daniel Yergeau, Robert W. Dutton, Sam Nakagawa, and Jeff Deeney; Fast Placement-Dependent Full Chip Thermal Simulation; Proceedings of International Symposium on VLSI Technology, Systems and Applications, 2001, pp. 249-252.
Haihua Su, Frank Liu, Anirudh Devgan, Emrah Acar, Sani Nassif; Full Chip Leakage Estimation Considering Power Supply and Temperature Variations; ISLPED'03, Aug. 25-27, 2003, Seoul, Korea, pp. 78-83.
Kevin Skadron, Mircea R. Stan, Wei Huang, Sivakumar Velusamy, Karthik Sankaranarayanan, and David Tarjan; Temperature-Aware Microarchitecture; Proceedings of the 30th International Symposium on Computer Architecture, 2003, 12 pages.
Ching-Han Tsai and Sung-Mo (Steve) Kang; Cell-Level Placement for Improving Substrate Thermal Distribution; IEEE Transactions on Computer-Aided Design of Integrated Circuits and Systems, vol. 19, No. 2, Feb. 2000, pp. 253-266.
Brent Goplen and Sachin Sapatnekar; Efficient Thermal Placement of Standard Cells in 3D ICs using a Force Directed Approach; Proceedings of the International Conference on Computer Aided Design (ICCAD'03), pp. 86-89.
Gary B. Kromann; Thermal Management of a C4/Ceramic-Ball-Grid Array: The Motorola PowerPC603TM and PowerPC604TM RISC Microprocessors; Twelfth IEEE Semi-ThermTM Symposium, 1996, pp. 36-42.
Stephen H. Gunther, Frank Binns, Douglas M. Carmean, Jonathan C. Hall; Managing the Impact of Increasing Microprocessor Power Comsumption; Intel Technology Journal Q1, 2001, 9 pages.
Tomas Skalicky; LASPack Reference Manual (version 1.12.2), Dresden University of Technology Institute for Fluid Mechanics, Aug. 13, 1995, 52 pages.
Vivek De and Shekhar Borkar; Technology and Design Challenges for Low Power and High Performance; Proceedings of the Internation Symposium Low Power Electronics and Design, San Diego, CA, 1999, pp. 163-168.
James R. Black, Electromigration Failure Modes in Aluminum Metallization for Semiconductor Devices; Proceedings of the IEEE, vol. 57, No. 9, Sep. 1969, 14 pages.
Ting-Yuan Wang et al., 3D Thermal-ADI—An Efficient Chip-Level Transient Thermal Simulator, ISPD'03, Apr. 6-9, 2003, Monterey, California, 8 pages.
Ting-Yuan Wang et al., Thermal-ADI—A Linear-Time Chip-Level Dynamic Thermal-Simulation Algorithm Based on Alternating-Direction-Implicit (ADI) Method, IEEE Transactions on Very Large Scale Integration (VLSI) systems, vol. 11, No. 4, Aug. 2003, pp. 691-700.

Ting-Yuan Wang et al., 3D Thermal-ADI: A Linear-Time Chip Level Transient Thermal Simulator, IEEE Transactions on Computer-Aided Design of Integrated Circuits and Systems, vol. 21, No.12, Dec. 2002, pp. 1431-1445.

Ting-Yuan Wang et al., Thermal-ADI: A Linear-Time Chip-Level Dynamic Thermal Simulation Algorithm Based on Alternating-Direction-Implicit (ADI) Method, ISPD'01, Apr. 1-4, 2001, Sonoma, California, 6 pages.

"Design Flow", Carleton University, Copyright John Knight, Revised; Sep. 30, 2003, pp. 1-22.

"Stratix II High-Speed Development Board", Data Sheet, Altera Corporation, Sep. 2004, ver. 1.0, pp. 1-85.

Szekely V. et al.: "A thermal benchmark chip: design and applications", Part A, IEEE Transactions on Components, Packaging, and Manufacturing Technology, vol. 21, No. 3, Sep. 1998, pp. 399-405.

Hang L. et al.: "Efficient thermal stimulation for run-time temperature tracking and management", Computer Design: VLSI in Computers and Processors, ICCD 2005 Proceedings, IEEE International Conference Oct. 2, 2005-Oct. 5, 2005, 4 pages.

International Search Report and Written Opinion for PCT/US2006/062184; mailed May 7, 2007; 11 pages.

Yonghong Yang et al.; Adaptive Chip-Package Thermal Analysis for Synthesis and Design; Design, Automation and Test in Europe, 2006. Date '06. Proceedings; Mar. 6-10, 2006; 6 pgs.

Yonghong Yang et al.; Adaptive multi-domain thermal modeling and analysis for integrated circuit synthesis and design; Computer-Aided Design, ICCAD '06. IEEE/ACM International Conference, Nov. 2006; pp. 575-582.

Excel Spreadsheet of Jul. 27, 2008 identifying references used to reject claims in related applications; 1 page.

Kaustav Banerjee et al., High-Current Failure Model for VLSI Interconnects Under Short-Pulse Stress Conditions, IEEE Electron Device Letters, vol. 18, No. 9, Sep. 1997, pp. 405-407.

Kaustav Banerjee et al., The Effect of Interconnect Scaling and Low-k Dielectric on the Thermal Characteristics of the IC Metal, Electron Devices Meeting, 1996, International, Dec. 8-11, 1996, an Francisco, CA, USA, pp. 65-68.

Wei Huang et al., 51.3 Compact Thermal Modeling for Temperature-Aware Design, HPLP and LAVA labs, Departments of ECE and CS, University of Virginia, Jun. 10, 2004, 27 pgs.

Wei Huang et al., Compact Thermal Modeling for Temperature-Aware Design, DAC 2004 Jun. 7-11, 2004, San Diego, California, USA, pp. 878-883.

Amir H. Ajami et al., Analysis of Substrate Thermal Gradient Effects on Optimal Buffer Insertion, Presentation Outline, ICCAD '01, Nov. 5, 2001, 29 slides on 5 pgs.

Amir H. Ajami et al., Analysis of Substrate Thermal Gradient Effects in Optimal Buffer Insertion, ICCAD '01, Proceedings of the 2001 IEEE/ACM international conference on Computer-aided design, Nov. 5, 2001, San Jose, California, pp. 44-48.

Amir H. Ajami et al., Analysis of Non-Uniform Temperature-Dependent Interconnect Performance in High Performance Ics, DAC'01, Jun. 18-22, 2001, Las Vegas, Nevada, USA, 6 pgs.

Kaustav Banerjee et al., Analysis and Optimization of Thermal Issues in High-Performance VLSI, ISPD'01, Apr. 1-4, 2001, Sonoma, California, USA, pp. 230-237.

Kaustav Banerjee et al., Analysis and Optimization of Thermal Issues in High Performance VLSI, Presentation Outline, ISPD 2001, 57 slides on 10 pgs.

Amir H. Ajami et al., Non-Uniform Chip-Temperature Dependent Signal Integrity, Digest of Technical Papers, 2001 Symposium on VLSI Technology, Jun. 12-14, 2001, Kyoto, Japan, 2 pgs.

Amir H. Ajami et al., Effects of Non-uniform Substrate Temperature on the Clock Signal Integrity in High Performance Designs, IEEE Conference on Custom Integrated Circuits, San Diego, CA, USA, May 6-9, 2001, 4 pgs.

Amir H. Ajami et al., Effects of Non-Uniform Substrate Temperature on the Clock Signal Integrity in High Performance Designs, Presentation Outline, CICC'01, May 8, 2001, 26 slides on 5 pgs.

Ting-Yuan Wang et al., Thermal-ADI—A Linear-Time Chip-Level Dynamic Thermal-Simulation Algorithm Based on Alternating-Direction-Implicit (ADI) Method, Poster, University of Wisconsin, 2003.

Ting-Yuan Wang et al., Spice-Compatible Thermal Simulation with Lumped Circuit Modeling for Thermal Reliability Analysis based on Modeling Order Reduction, Proceedings of the 5th International Symposium on Quality Electronic Design, Mar. 22-24, 2004, 6 pgs.

Rajit Chandra, Impact of Thermal Analysis on Large Chip Design, Outline, Electronic Design Process Symposium Monterey, CA, Apr. 7, 2005, 25 pgs.

Peng Li, Efficient Full-Chip Thermal Modeling and Analysis, Proceedings of the 2004 IEEE/ACM International conference on Computer-aided design, Nov. 7-11, 2004, pp. 319-326.

Vladimir Koval et al., Monstr: a complete thermal simulator of electronic systems, Proceedings of the 31st annual conference on Design Automation, San Diego, California, Jun. 6-10, 1994, 6 pgs.

Rajit Chandra, A thermal-aware IC design methodology, http://www.eetimes.com/showArticle.jhtml?articleID=164302273 &printable=true, Jun. 13, 2005, 7 pgs.

Sheng-Chih Lin and Kaustav Banerjee, "Cool Chips: Opportunities and Implications for Power and Thermal Management", IEEE Transactions on Electron Devices, vol. 55, No. 1, Jan. 2008 pp. 245-255.

\* cited by examiner

*Primary Examiner*—Stacy A Whitmore
(74) *Attorney, Agent, or Firm*—PatentVentures; Bennett Smith; Korbin Van Dyke

(57) ABSTRACT

A thermally aware design automation suite integrates system-level thermal awareness into the design of semiconductor chips. A thermal analysis engine performs fine-grain thermal simulations of the semiconductor chip based on thermal models and boundary conditions for all thermally significant structures in the chip and the adjacent system that impact the temperature of the semiconductor chip. The thermally aware design automation suite uses the simulations of the thermal analysis engine to repair or otherwise modify the thermally significant structures to equalize temperature variations across the chip, impose specified design assertions on selected portions of the chip, and verify overall chip performance and reliability over designated operating ranges and manufacturing variations. The thermally significant structures are introduced or modified via one or more of: change in number, change in location, and change in material properties.

77 Claims, 25 Drawing Sheets

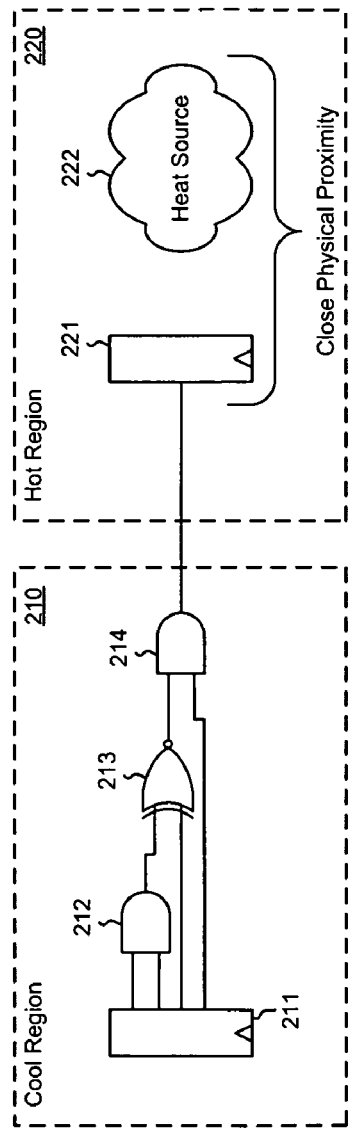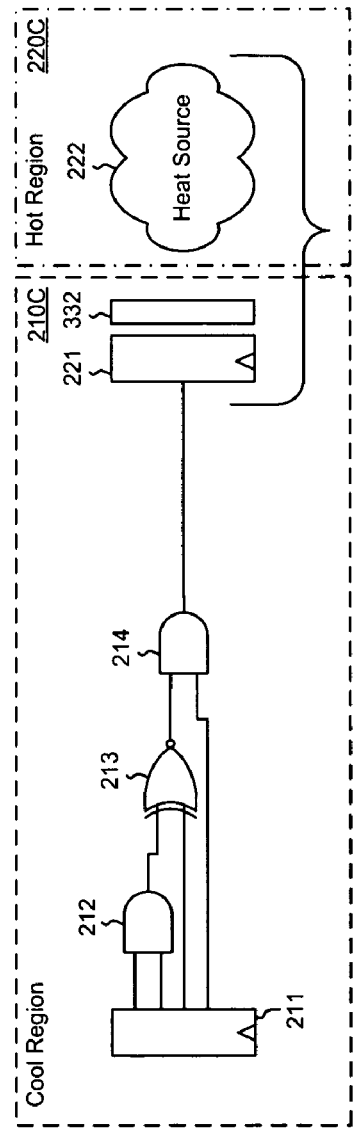

SEMICONDUCTOR CHIP DESIGN HAVING THERMAL AWARENESS ACROSS MULTIPLE SUB-SYSTEM DOMAINS

CROSS REFERENCE TO RELATED APPLICATIONS

Priority benefit claims for this application are made in the accompanying Application Data Sheet (if any). To the extent permitted by the type of the instant application, this application incorporates by reference for all purposes the following applications, which are all owned by the owner of the instant application:

U.S. application Ser. No. 11/317,664 filed herewith, by Rajit Chandra, and entitled Method and Apparatus for Thermally Aware Design Improvement;

U.S. application Ser. No. 11/317,670 filed herewith, by Rajit Chandra, and entitled Method and Apparatus for Generating and Using Thermal Test Vectors;

U.S. Provisional Application Ser. No. 60/751,376 filed Dec. 17, 2005, by Rajit Chandra, et al., and entitled Semiconductor Chip Design Having Thermal Awareness Across Multiple Sub-System Domains;

U.S. Provisional Application Ser. No. 60/734,372 filed Nov. 7, 2005, by Rajit Chandra, et al., and entitled Efficient Full-Chip Thermal Modeling and Analysis;

U.S. Provisional Application Ser. No. 60/718,138 filed Sep. 16, 2005, by Rajit Chandra, and entitled Method and Apparatus for Temperature Assertion Based IC Design;

U.S. application Ser. No. 11/215,783 filed Aug. 29, 2005, by Rajit Chandra, and entitled Method and Apparatus for Normalizing Thermal Gradients Over Semiconductor Chip Designs;

U.S. application Ser. No. 11/198,467 filed Aug. 5, 2005, by Rajit Chandra, and entitled Method and Apparatus for Optimizing Thermal Management Systems Performance Using Full-Chip Thermal Analysis of Semiconductor Chip Designs;

U.S. application Ser. No. 11/198,470 filed Aug. 5, 2005, by Rajit Chandra, and entitled Method and Apparatus for Using Full-Chip Thermal Analysis of Semiconductor Chip Designs to Compute Thermal Conductance;

U.S. application Ser. No. 11/180,353 filed Jul. 13, 2005, by Ping Li, et al., and entitled Method and Apparatus for Thermal Modeling and Analysis of Semiconductor Chip Designs;

U.S. Provisional Application Ser. No. 60/689,592 filed Jun. 10, 2005, by Rajit Chandra, and entitled Temperature-Aware Design Methodology;

U.S. application Ser. No. 11/078,047 filed Mar. 11, 2005, by Rajit Chandra, et al., and entitled Method and Apparatus for Thermal Testing of Semiconductor Chip Designs;

U.S. Provisional Application Ser. No. 60/658,323 filed Mar. 3, 2005, by Rajit Chandra, and entitled Method and Apparatus for Generating and Using Thermal Test Vectors;

U.S. Provisional Application Ser. No. 60/658,324 filed Mar. 3, 2005, by Rajit Chandra, and entitled Method and Apparatus for Thermally Aware Design Improvement;

U.S. application Ser. No. 11/039,737 filed Jan. 20, 2005, by Rajit Chandra, and entitled Method and Apparatus for Retrofitting Semiconductor Chip Performance Analysis Tools with Full-Chip Thermal Analysis Capabilities; and U.S. application Ser. No. 10/979,957 filed Nov. 3, 2004, by Rajit Chandra, and entitled Method and Apparatus for Full-Chip Thermal Analysis of Semiconductor Chip Designs.

BACKGROUND

1. Field

Advancements in semiconductor chip design are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. To the extent permitted by application type, all references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

SUMMARY

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. As is discussed in more detail in the Conclusions, the invention encompasses all possible modifications and variations within the scope of the issued claims, which are appended to the very end of the issued patent.

A thermally aware design automation suite is taught herein for integrating system-level thermal awareness into the design of semiconductor chips. A thermal analysis engine performs fine-grain thermal simulations of the semiconductor chip based on thermal models and boundary conditions for all thermally significant structures in the chip and the adjacent system that impact the temperature of the semiconductor chip. The thermally aware design automation suite uses the simulations of the thermal analysis engine to repair or otherwise modify the thermally significant structures to equalize temperature variations across the chip, impose specified design assertions on selected portions of the chip, and verify overall chip performance and reliability over designated operating ranges and manufacturing variations.

BRIEF DESCRIPTION OF DRAWINGS

Various embodiments of the invention are disclosed in the following detailed description and the accompanying drawings.

FIG. 13 illustrates an example of a hold time problem made apparent by thermally aware analysis.

FIG. 14 illustrates an example repair techniques for the hold time problem of FIG. 13, as provided by thermally aware design improvement.

DETAILED DESCRIPTION

Figure 1A:
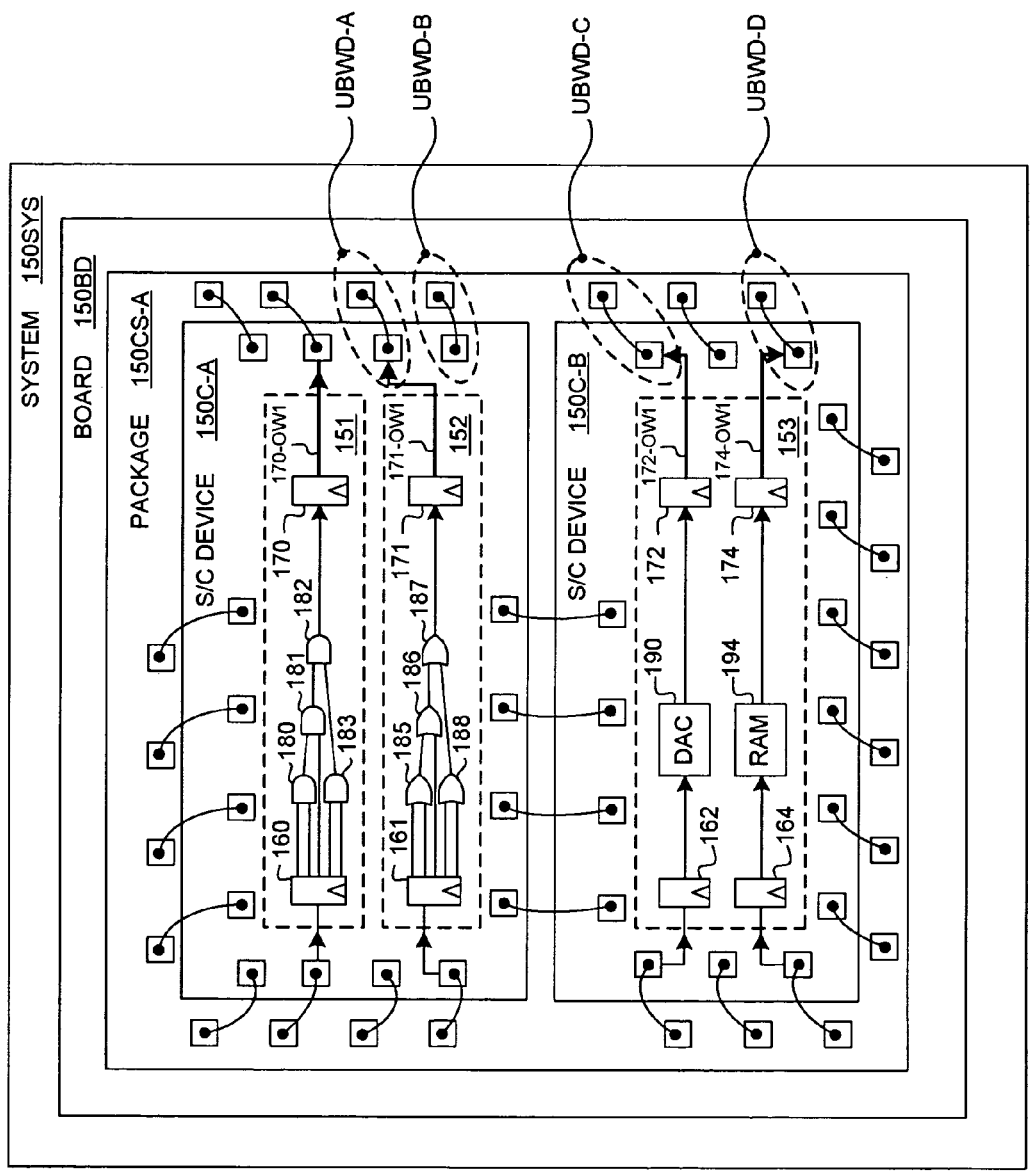
FIGS. 1A and 1B illustrate a system in which the design of semiconductor devices is improved using thermally aware design automation to determine interconnect characteristics, including the width of selected wires and the density of selected wire bonds.

A detailed description of one or more embodiments of the invention is provided below along with accompanying figures that illustrate the principles of the invention. Some of the embodiments or variations thereof may be characterized as "notable." The invention is described in connection with the embodiments, which are understood to be merely illustrative and not limiting. The invention is expressly not limited to or by any or all of the embodiments herein (notable or otherwise). The scope of the invention is limited only by the claims appended to the end of the issued patent and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

Thermal-aware design automation methods and functional subsystems as taught herein use three dimensional thermal analysis to develop simulated three dimensional chip temperature distributions to guide design changes to improve the temperature distribution (to meet chip design goals and avoid latent defects), to improve chip performance, and to improve chip reliability. One use of the thermal-aware methods is to guide the selection between otherwise functionally interchangeable components, structures, or other design resources that are differentiated by their thermal conductance, and thus can be substituted to alter the chip temperature distribution to accomplish an intended result.

Thermal improvements (a.k.a. thermal repairs) of the design reduce, equalize, or smooth, temperatures in particular localized regions. Unimproved designs can suffer from poor performance, poor reliability, or both. Unanticipated localized heating can problematically change circuit behavior due to increased IR-drops, slower transitions, and longer delays. Undesirable temperature distributions can unbalance otherwise balanced circuits and create signal integrity problems. Excessive temperature concentrations (hot spots) can exacerbate electromigration failure mechanisms.

Thermal improvements are achieved by the introduction or modification of thermally significant structures via for example, a change in number, a change in location, or a change in material properties. Thermally significant structural changes which are contemplated include (but are not limited to): solder bump (e.g. C4-bump) location and density; solder-bump-related underfill composition; thermal via location, density, and metal composition; heat sink configuration including fin location, density, and height; metal fill location and density; wire location, width, and metal composition; and bond wire location and density.

Fabrication process steps are contemplated to expand the available chip design resources (structure, components) to include otherwise equivalent components that are differentiated by their thermal conductance. For example, such process steps enable at least some regions on at least one layer to be a selected one of a plurality of metallization types having respectively different elemental compositions. In particular, a high heat conduction metal such as Ti, can be selectively used where enhanced thermal conductivity is needed or warranted. Such special metallization can be used for vias, metal layers, or both. Vias (whether enhanced by special metallization or not) may be employed to reduce local heating (for any of the reasons cited previously), to electrically couple circuitry on proximate metal layers, or both.

Particular System-Level Thermally Aware Improvements

Figure 1B:
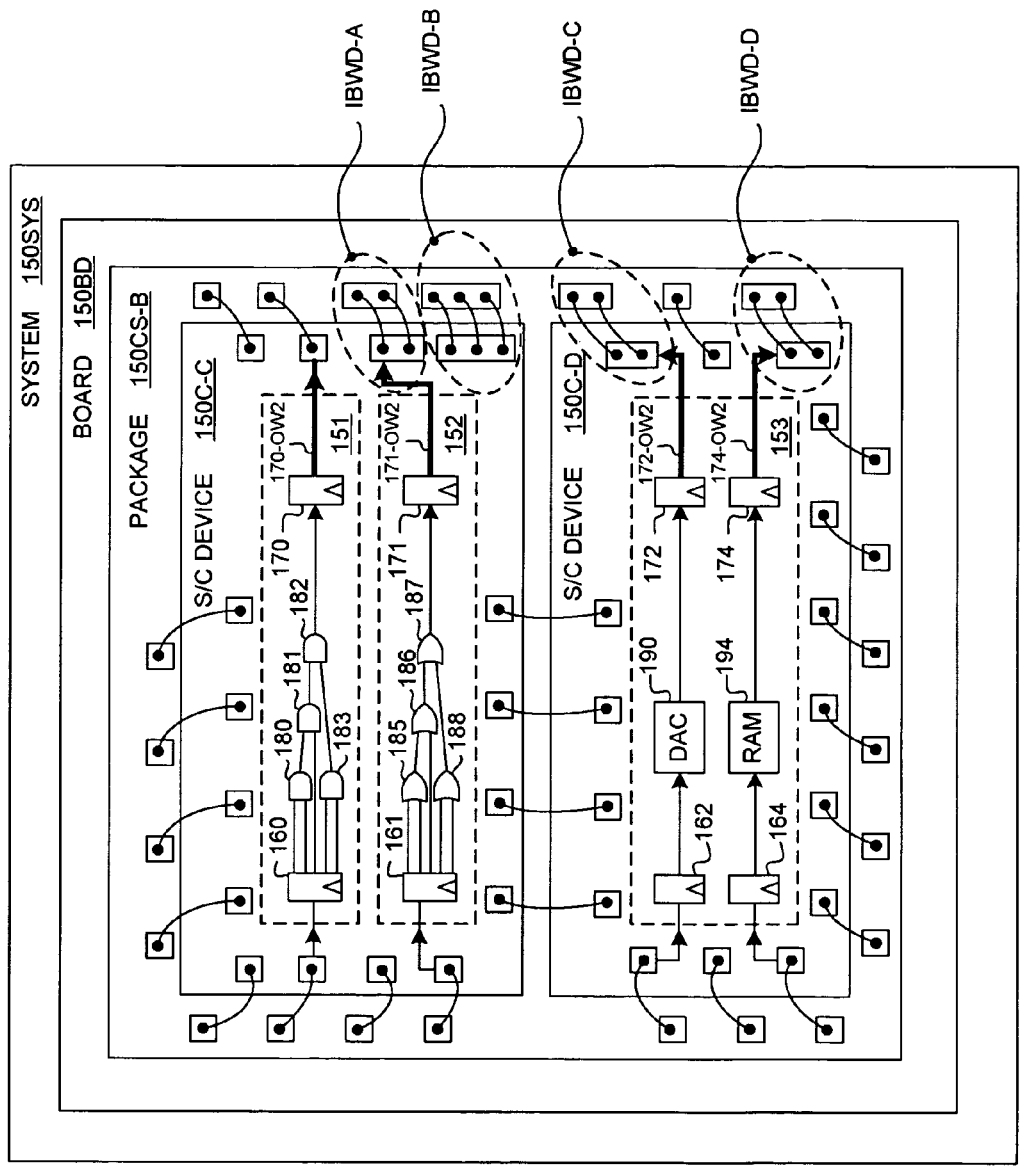
Figure 2A:
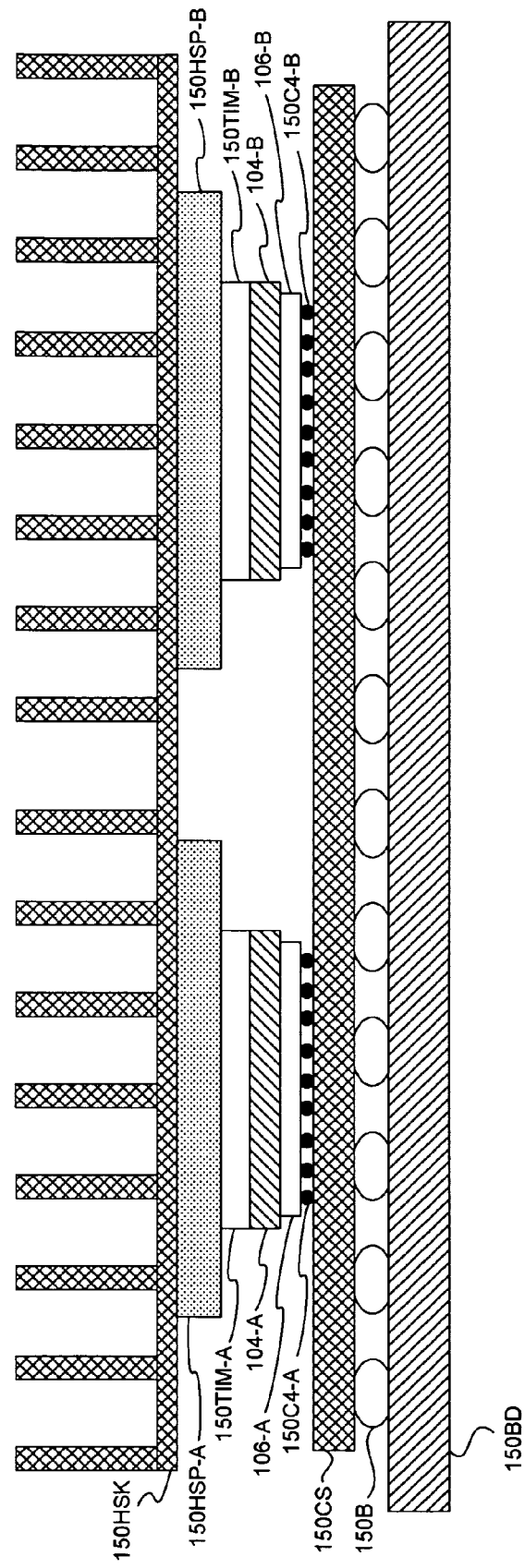
FIGS. 2A through 2C illustrate a system in which the design of semiconductor devices is improved using thermally aware design automation to determine system boundary condition characteristics, including the density of selected C4 Pads and the configuration of selected portions of the heat sink.

FIGS. 1A and 1B illustrate a system in which the design of semiconductor devices is improved using thermally aware design to analyze and automatically improve the thermal characteristics of interconnect, including the width of selected wires and the density of selected wire bonds. FIG. 1A illustrates system 150SYS, including board 150BD having unimproved package 150CS-A with unimproved semiconductor devices 150C-A and 150C-B, having respective digital and mixed signal electronics as shown. FIG. 2A illustrates system 150SYS, including board 150BD having improved package 150CS-B with improved semiconductor devices 150C-C and 150C-D.

In comparing FIGS. 1A and 1B, attention is first drawn to the wire widths of the outputs of flip-flops 170, 171, 172, and 174. In FIG. 1A, respectively these are 170-OW1, 171-OW1, 172-OW1, and 174-OW1, where OW1 signifies "output width 1". In FIG. 1B, respectively these are 170-OW2, 171-OW2, 172-OW2, and 174-OW2, where OW2 signifies "output width 2". In further comparing FIGS. 1A and 1B, attention is next drawn to the number of wire bonds (the wire bond density) used as interconnect between the two semiconductor devices and the package for various nodes. Exemplary wire bond couplings in FIG. 1A are identified as UBWD-A, UBWD-B, UBWD-C, and UBWD-D, where UBWD signifies "unimproved wire bond density". Corresponding wire bond couplings in FIG. 2A are identified as IBWD-A, IBWD-B, IBWD-C, and IBWD-D, where IBWD signifies "improved wire bond density".

The above examples are suggestive of the types of improvements (a.k.a. repairs) that can be made to wires to selectively alter the temperature profile of the chip in a selected region. More generally, in response to a thermal analysis in accordance with the teachings herein, wire thermal characteristics can be altered by one or more of the following exemplary but not limiting approaches: changing wire routing, changing the width of one or more wires, changing the resistivity of one or more wires, and changing the elemental composition of one or more wires. In the foregoing, the term "wire" includes but is not limited to patterned chip interconnect (such as patterned source/drain, poly, or metal), patterned package interconnect, and wire bonds. While metallization and vias are also forms of interconnect than can be similarly modified, they are treated separately below.

Figure 2B:
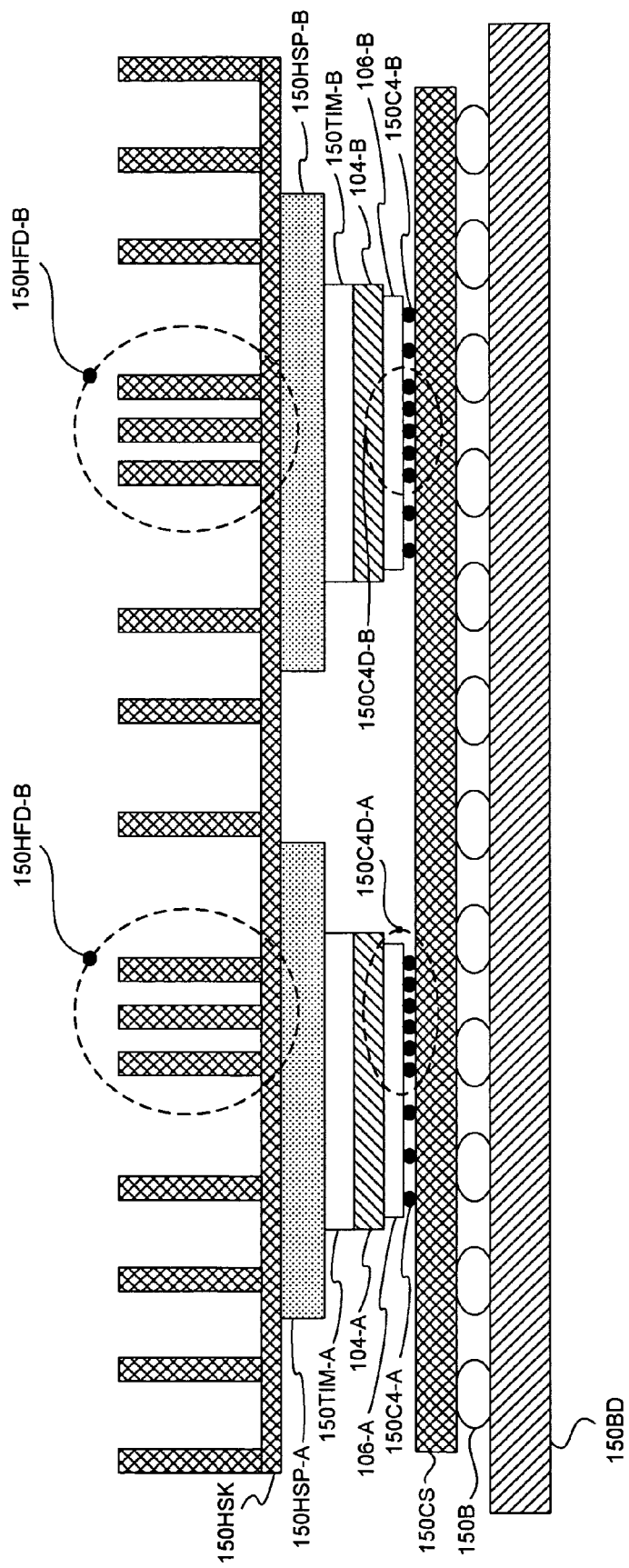
Figure 2C:
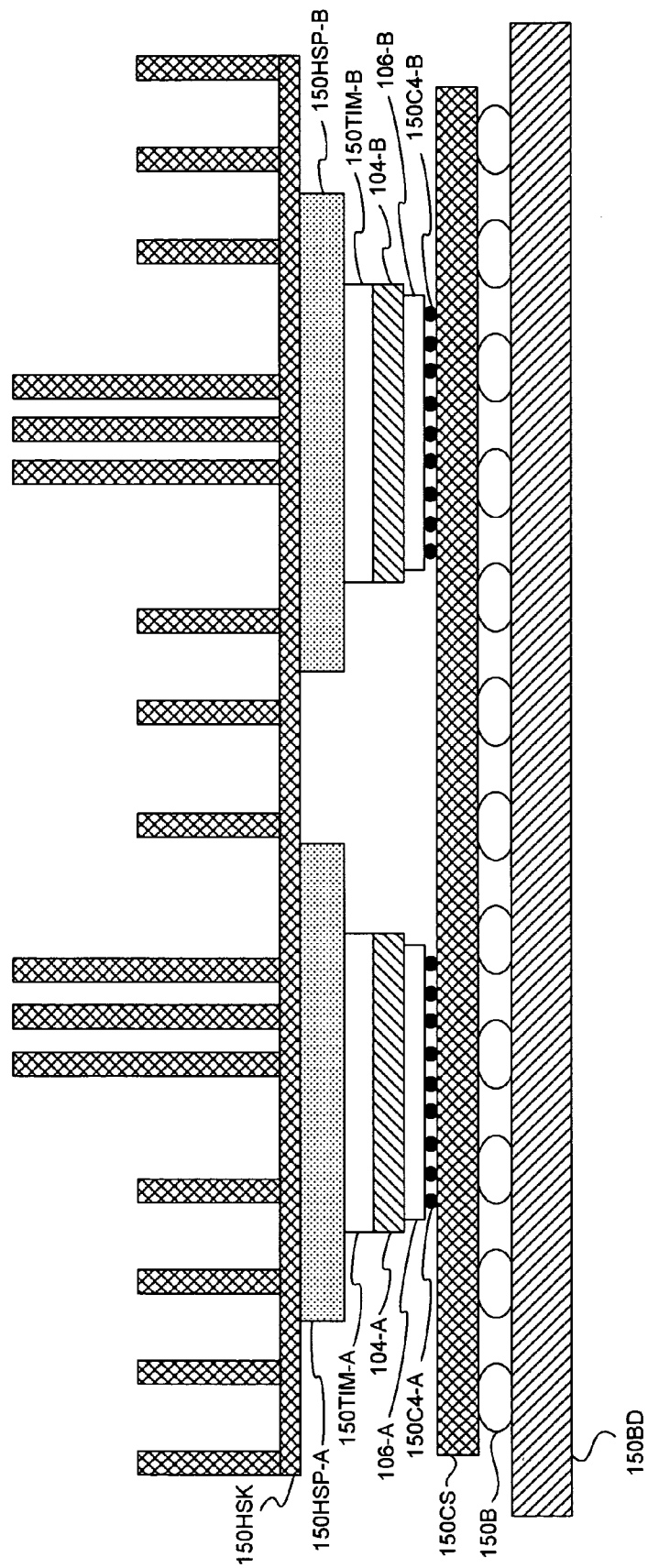

FIGS. 2A through 2C illustrate a system in which the design of semiconductor devices is improved using thermally aware design automation to improve system boundary condition characteristics (with respect to the semiconductor device), including changes in the density of selected C4 Pads and the configuration of selected portions of the heat sink. (Note that in FIGS. 2A-2C, the "-A" and "-B" suffixes corresponding to the left and right chips, respectively.) Components common in these three views include: printed-circuit board 150BD, ball grid array solder joints 150B, ceramic substrate 150CS, C4 bumps (a.k.a. solder bumps) and underfill (a.k.a. encapsulation) instances 150C4-A and 150C4-B, interconnect layer instances 106-A and 106-B, silicon bulk instances 104-A and 104-B, thermal interface material instances 150TIM-A and 150TIM-B, heat spreaders 150HSP-A and 150HSP-B, and heat sink 150HSK. In comparing FIGS. 2A and 2B, attention is directed to the change in heat sink fin distribution associated with the regions identified by 150HFD-A and 150HFD-B in FIG. 2B and further by the change in C4 bump distribution associated with the regions identified by 150C4D-A and 150C4D-B (also in FIG. 2B). In FIG. 2C, the height of selected heat sink fins has also been changed.

The above examples are merely suggestive of the types of improvements or repairs that can be made to system (extra-chip) thermal boundary conditions to selectively alter the temperature profile of a chip (or chips) in one or more selected regions. More generally, in response to a thermal analysis in accordance with the teachings herein, system thermal boundary characteristics can be altered by one or more of the following exemplary but not limiting approaches: changing the configuration of die-to-package attachment, package design, and heat dissipater design.

In turn, altering the thermal characteristics of the die-to-package attachment can be accomplished by one or more of the following exemplary but not limiting approaches: changing the configuration of solder bumps, final metal attachment pads (for solder bumps or wire bonds), and underfill (an optional encapsulant between the solder bumps). Altering the thermal characteristics of the solder bumps can be accomplished by one or more of the following exemplary but not limiting approaches: changing the number, placement, density, and elemental composition of one or more solder bumps in at least one region. Altering the thermal characteristics of final metal attachment pads can be accomplished by one or more of the following exemplary but not limiting approaches: changing the number, placement, density, distribution, and elemental composition of one or more final metal attachment pads in at least one region. Altering the thermal characteristics of the underfill can be accomplished by one or more of the following exemplary but not limiting approaches: changing the application and elemental composition of the underfill in at least one region. Altering the thermal characteristics of the package design can be accomplished by one or more of the following exemplary but not limiting approaches: changing the package interconnect, metallization, and vias. Altering the thermal characteristics of the heat dissipater design can be accomplished by one or more of the following exemplary but not limiting approaches: changing the number, placement, orientation, geometry, height, density, and elemental composition of one or more heat sink fins in at least one region.

Figure 3A:
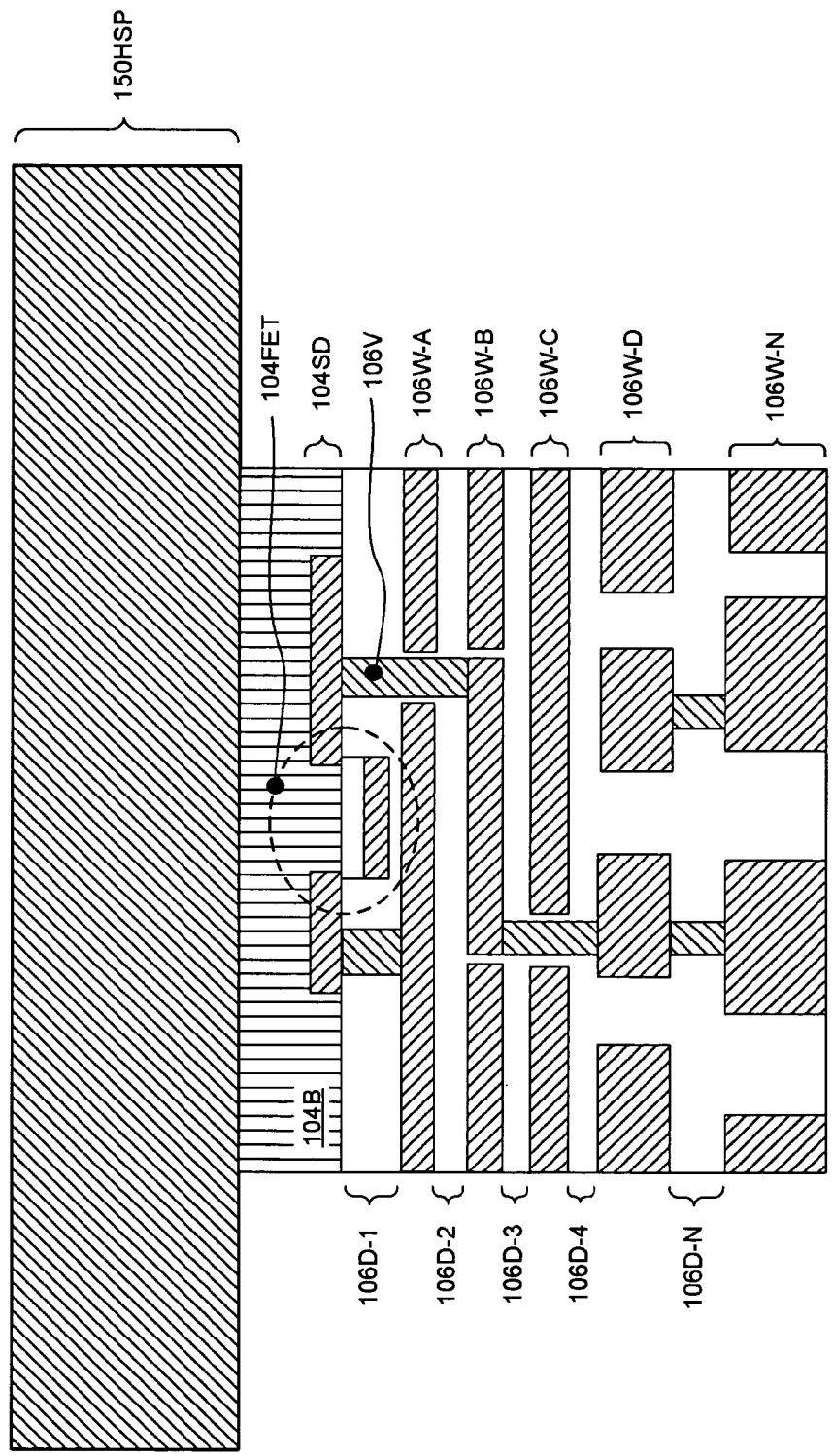
FIGS. 3A through 3C illustrate a semiconductor device improved using thermally aware design automation to determine interconnect characteristics, including the configuration of selected vias and the material property of selected wires.
Figure 3B:
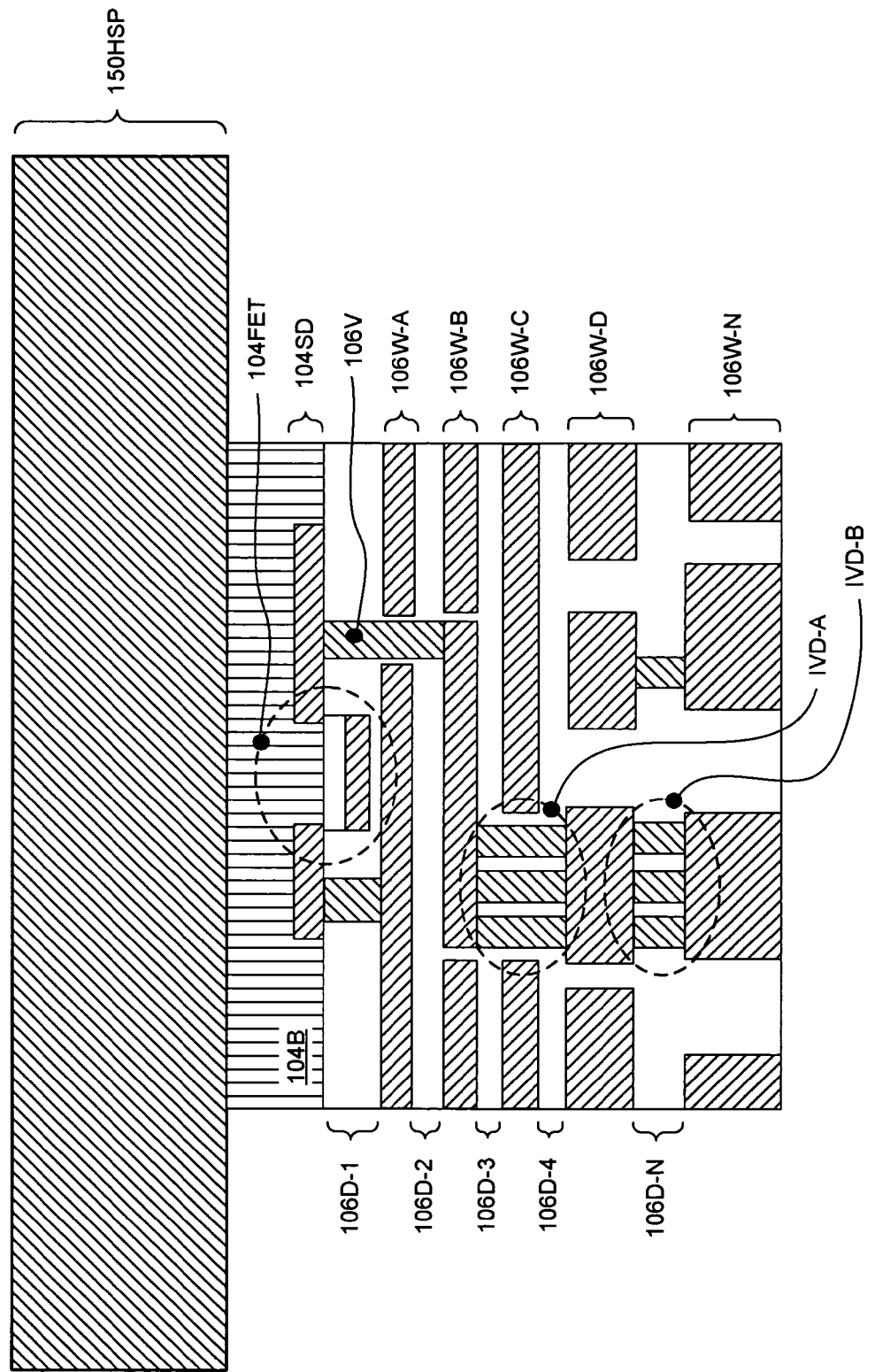
Figure 3C:
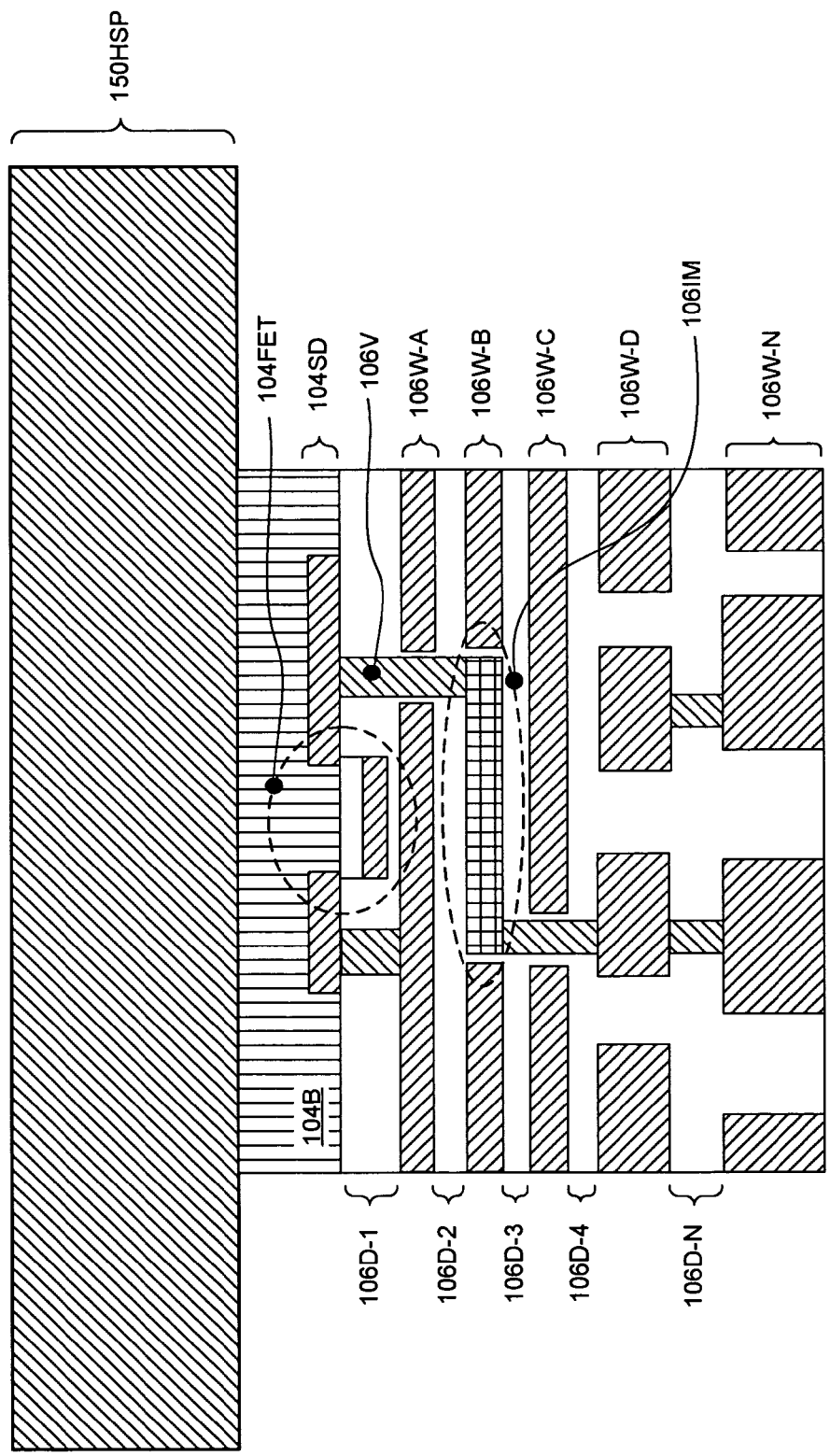

FIGS. 3A through 3C illustrate a semiconductor device improved using thermally aware design automation to determine interconnect characteristics, including the configuration of selected vias and the material property of selected wires. Components common in these three views include: heat dissipater 150HD (representing one or more of the thermal interface material, heat spreader, and heat sink of FIGS. 2A-2C); semiconductor bulk 104B; source/drain region 104SD; field effect transistor 104FET; dielectric insulations layers 106D-1, 106D-2, 106D-3, 106D-4, and 106D-N; local wire (conducting) layer 106W-A, intermediate scope wire layers 106W-B and 106W-C, semi-global wire 106W-D, and global wire 106W-N; and via 106V.

When compared to FIG. 3A, FIG. 3B draws attention to improved via density IVD-A and IVD-B between multiple layers of interconnect. This is illustrative of but one of many types of improvements or repairs that can be made to vias to selectively alter the temperature profile of a chip in one or more selected regions. More generally, in response to a thermal analysis in accordance with the teachings herein, vias can be altered by one or more of the following exemplary but not limiting approaches: changing the number, placement, density, arrangement, cross section, resistivity, and elemental composition of one or more vias in at least one region.

When compared to FIG. 3A, FIG. 3C draws attention to improved metallization 106IM in a selected portion of conducting layer 106W-B. That is, metallization with a different elemental composition than the surrounding metallization has been used in the highlighted wire segment to selectively alter the temperature profile in the illustrated region of the chip. This is illustrative of but one of many types of improvements or repairs that can be made to metallization to selectively alter the temperature profile of a chip in one or more selected regions. More generally, in response to a thermal analysis in accordance with the teachings herein, metallization can be altered by one or more of the following exemplary but not limiting approaches: changing the location, patterning, cross section, thickness, tile arrangement, tile density, and elemental composition of the metallization in at least one region.

Figure 4A:
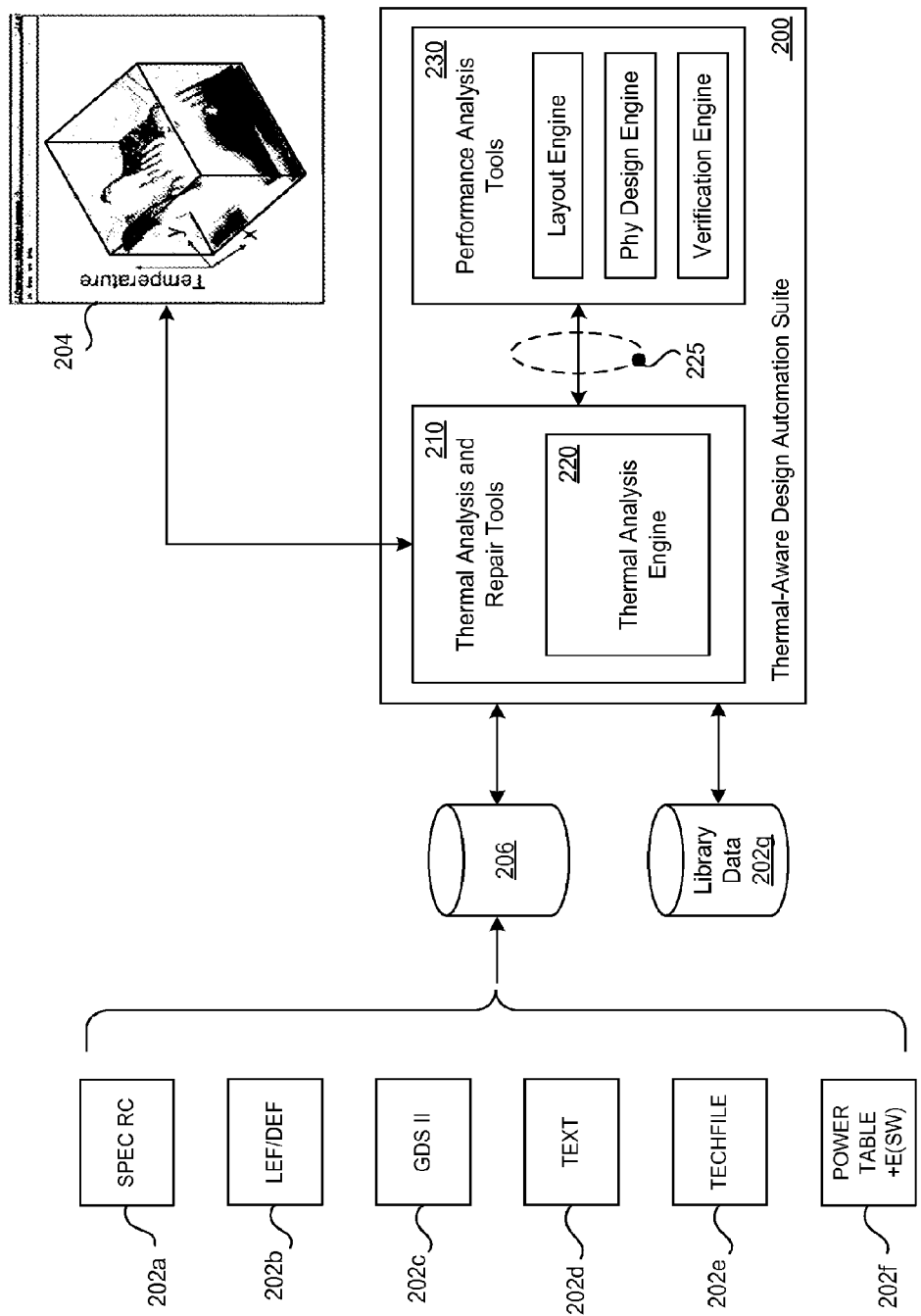
FIG. 4A illustrates selected components of a thermally ware design automation suite system and its related inputs, data, and output.

FIG. 4A illustrates selected components of a thermal-aware design automation suite 200 and its related inputs, data, and output. As illustrated, the thermal analysis suite 200 is adapted to receive a plurality of inputs 202a-202g (hereinafter collectively referred to as "inputs 202") and process these inputs 202 to produce a full-chip (e.g., three-dimensional) thermal model 204 of a proposed semiconductor chip design.

In an exemplary but not limiting embodiment, the plurality of inputs 202 includes industry standard design data 202a-202f (e.g., pertaining to the actual chip design or layout under consideration) and library data 202g (e.g., pertaining to the semiconductor devices and interconnects incorporated in the design). The industry standard design data may include one or more of the following types of data: electrical component extraction data and extracted parasitic data (e.g., embodied in standard parasitic extraction files, or SPEFs, 202a), design representations including layout data (e.g., embodied in Library Exchange Format/Design Exchange Format, or LEF/DEF files 202b, Graphical Design Format II, or GDSII, files 202c and/or text files 202d), manufacturer-specific techfiles 202e describing layer information and package models, user-generated power tables 202f including design data (e.g., including a switching factor, E(sw)). In one embodiment, this industry standard design data 202a-202f is stored in a design database 206 such as an open access database or a proprietary database. In one embodiment, the library data 202g is embodied in a library that is distributed by a semiconductor part manufacturer or a library vendor. In another embodiment, the library incorporating the library data 202g can be built in-house by a user.

As illustrated, the thermal analysis suite 200, includes performance analysis tools 230 and thermal analysis and repair tools 210. The performance analysis tools 230 may include engines (software subsystems) for providing layout, physical design, and verification services (callable tasks and procedures). The thermal analysis and repair tools include a thermal analysis engine 220 and generate the full-chip thermal model 204 of the semiconductor chip under design.

Figure 4B:
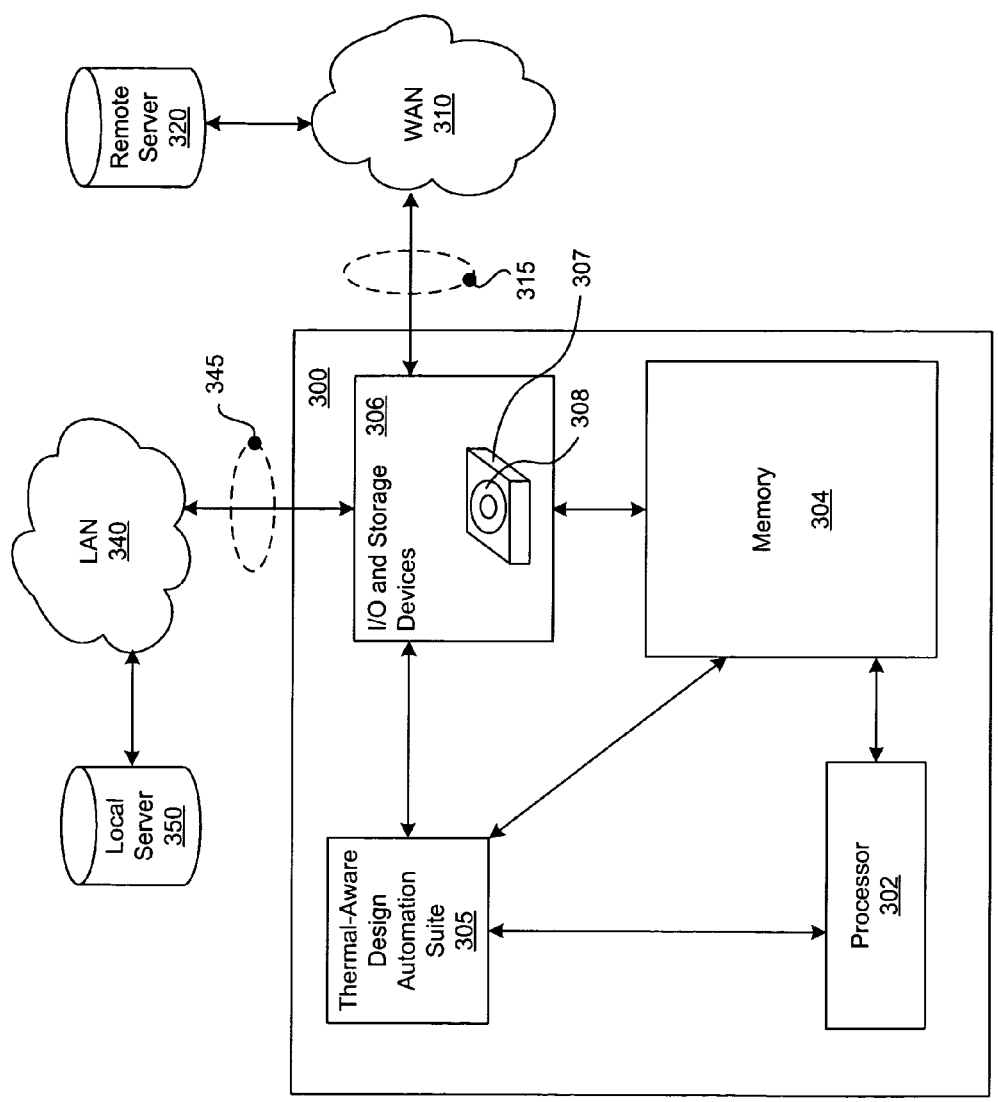
FIG. 4B illustrates the system environment associated with the thermally aware design automation suite of FIG. 4A.

FIG. 4B illustrates the system environment associated with the thermally aware design automation suite of FIG. 4A. Computer System 300 is a general purpose computing system such as a Personal Computer (PC), Workstation, or Server, and includes a Processor 302, a Memory 304, a Thermal Computation Module 305 and various Input/Output (I/O) and Storage Devices 306. The I/O and Storage Devices module includes any combination of a display, a keyboard, a mouse, a modem, a network connection, a magnetic disk drive, an optical disk drive, and similar devices. In some embodiments several or all of the aforementioned procedures (such as "Thermal Analysis and Repair Tools" 210, "Thermal Analysis Engine 220" 220, and optionally portions of "Performance Analysis Tools" 230) are implemented via Thermal-Aware Design Automation Suite 200.

In some embodiments Thermal-Aware Design Automation Suite 200 is implemented as a physical device or subsystem that is coupled to a processor through a communication channel. Alternatively, the Thermal Computation Module may be implemented by one or more software applications (or even a combination of software and hardware, e.g., using Application Specific Integrated Circuits (ASIC)), where the software is loaded from a storage medium (such as from I/O and Storage Devices 306) and operated by Processor 302 in Memory 304 of Computer System 300. Thus, in some embodiments, Thermal-Aware Design Automation Suite 200, described herein with reference to the preceding figures, can be stored on a computer readable medium or carrier (e.g., RAM, magnetic or optical drive or diskette, and similar storage media; see removable media 307 and media reader 308).

Additionally, the software may run in a distributed or partitioned fashion on two or more computing devices similar to Computer System 300. The collaborating computing devices may be linked via network connection 345 to Local Area Network 340 and via network connection 315 to Wide Area Network 310. Furthermore, use may be made of networked Local Server 350 and Remote Server 320, for library and data storage, program updates, and license validation, among other uses.

Figure 4C:
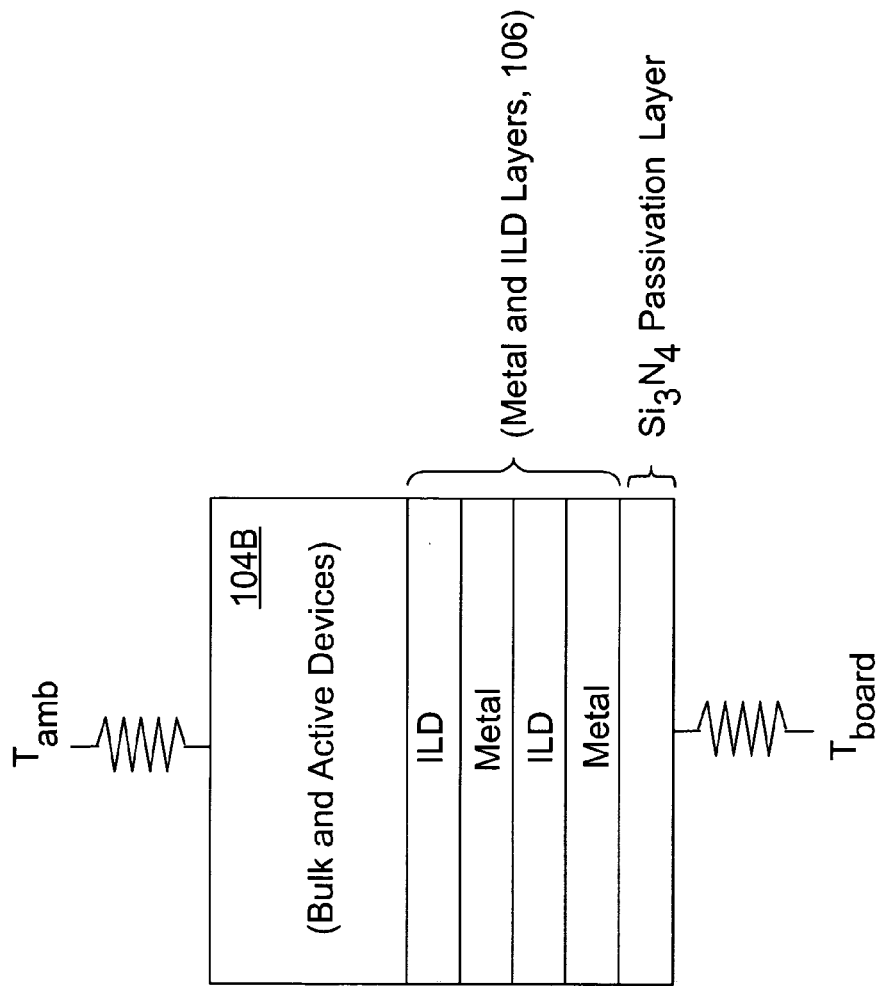
FIG. 4C illustrates a simplified view of a thermal model used by the thermally aware design automation suite of FIGS. 4A and 4B, in conjunction with the modeling of the semiconductor devices of FIGS. 3A through 3C, and in particular in the system contexts of FIGS. 2A through 2C.

FIG. 4C shows a simplified view of a thermal model used by the thermally aware design automation suite of FIGS. 4A and 4B, in conjunction with the modeling of the semiconductor devices of FIGS. 3A through 3C, and in particular in the system contexts of FIGS. 2A through 2C. The full chip thermal model must account for boundary conditions, including, but not limited to, the packaging, board, and heat sink configuration and design, as well as material anisotropy and conductance (K) variations. The thermal conductance of the substrate layer is modeled according to the density and/or presence of active devices and implanted interconnect. The thermal conductance of each inter-layer dielectric (ILD) layer is respectively modeled according to the density and/or presence of vias/contacts (made using e.g., TiN and/or $WTiSi_2$) vs. dielectric isolation (e.g., $SiO_2$ and/or $Si_3N_4$). The thermal conductance of each metal layer is respectively modeled according to the density and/or presence of metallization vs. dielectric isolation.

User Interface (UI) features of enhanced temperature aware analysis tools are illustrated with reference again to FIG. 4D. As indicated by the slider on the right of FIG. 4D, the particular profile shown is for a depth of the chip selected to correspond to the channel region. Selection of other depths via the slider, results in presentation of the temperature profile at the selected chip depth.

Figure 4D:
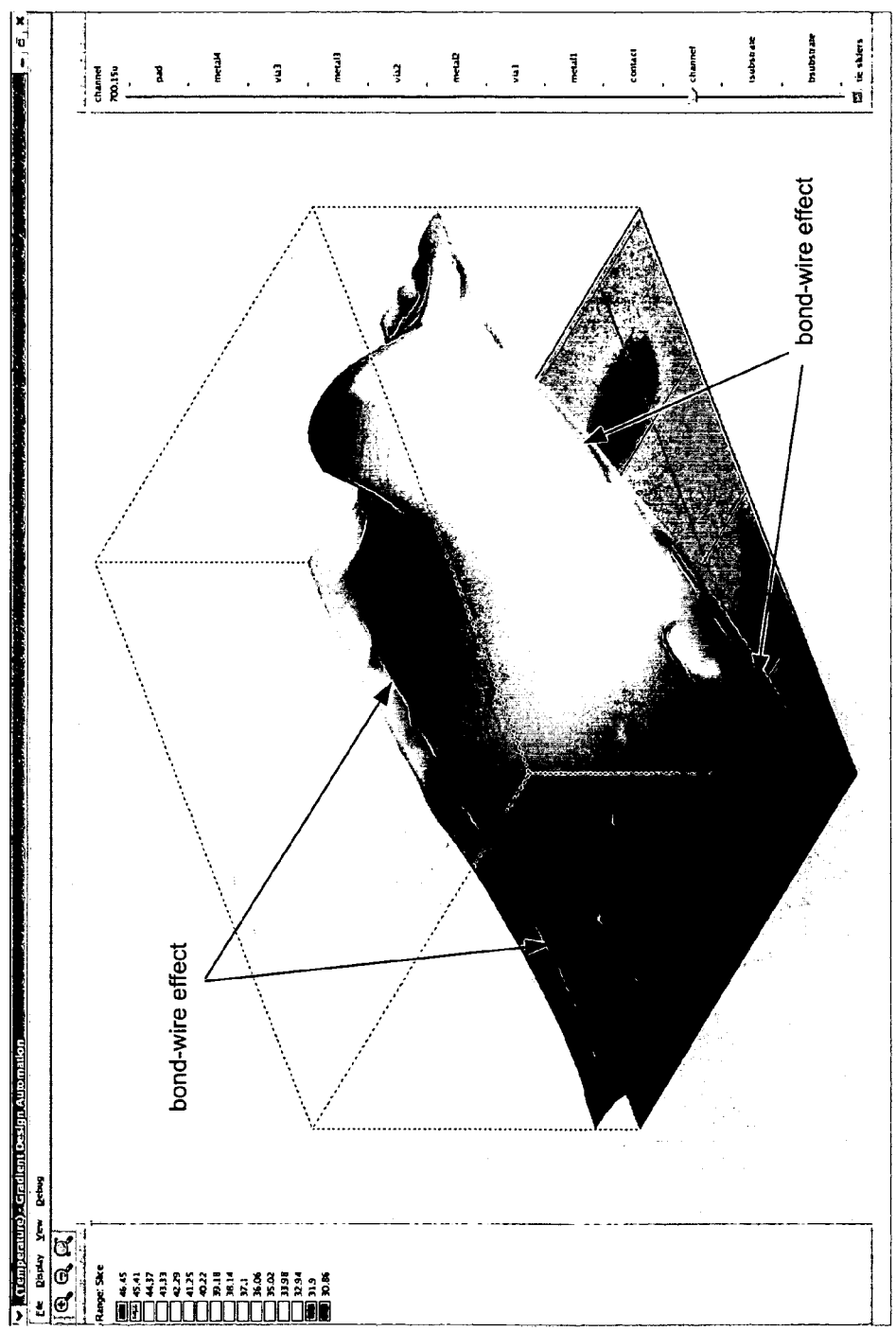
FIG. 4D is a grayscale rendition of a colorized three-dimensional surface representing the temperature profile across a die, including considering package characteristics as boundary conditions.

In FIG. 4D the vertical axis corresponds to temperature and increasing heights on the three-dimensional surface correspond to increasing temperature on the chip. The three-dimensional surface profile presents height gradients that are proportional to the temperature gradients on the chip. In addition to representing temperature by the height, in full-color versions of FIG. 4D, gradations of color are mapped onto select intervals of the temperature range. This is shown by the "Range" legend in the upper left. In full-color versions of FIG. 4D, the legend boxes have gradations of the color spectrum progressively ranging from violet at the lowest temperatures in the range shown, through blue, green, yellow, orange, and red for the highest temperature in the range. Thus in full-color versions of FIG. 4D, temperature is redundantly represented by the height of the three-dimensional surface and the color of the surface. The height gradient and the color mapping each provides readily perceived visual clues of precisely how the temperature varies over the extent of the chip. In FIG. 4D, the color of the three-dimensional surface is also projected onto the plane lying underneath the surface. The color projection contains the same color information as the three-dimensional surface, but without the height information.

Figure 4E:
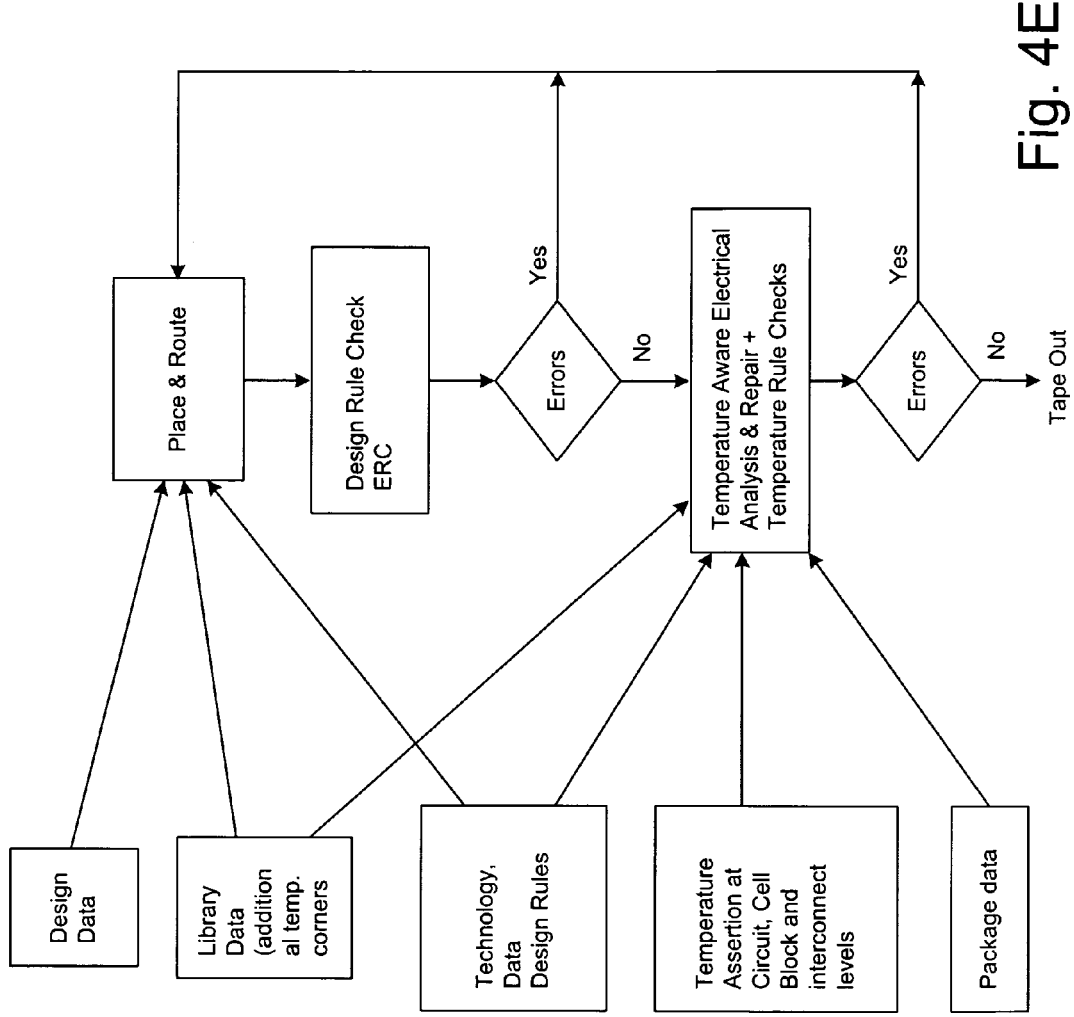
FIG. 4E illustrates an exemplary temperature-aware design flow.

FIG. 4E shows an exemplary but not limiting temperature-aware design flow. The key point in this flow is the use of a temperature analysis and repair capability. The temperatures for all parts of the chip are computed and then used in conjunction with existing flows to achieve temperature aware analysis and repair. In notable embodiments, temperatures are computed using one or more of the techniques described in the various patent applications listed in the cross-reference section above.

The inputs to the temperature-aware flow are the design layout data, the stack description and technology data for the materials used, and the package characteristics. In notable embodiments, the inputs also include assertions on the temperature requirements for the correct operation of the circuits and the long-term reliability of the chip. The temperature-aware flow, in conjunction with a proper thermal analysis, can use such assertions to produce a chip that meets new temperature-aware criteria, leading to shorter design cycles and more reliable and lower-power chips.

Assertions can be global to the whole chip (e.g., temperature within a certain range anywhere on the chip), or they can be attached to some physical or logical structure in the chip (e.g., the clock net is within a certain temperature range, a set of transistors are at the same temperature, etc.). In notable embodiments, assertions directly or indirectly (by a tool enforcing the assertion) cause circuit elements to be moved, transistor types to be changed, heating or cooling elements to be inserted, etc. In notable embodiments, assertions operate in conjunction with package-level thermal analysis, whereby modifications of the package, as well as the die, are used to help solve on-chip thermal problems.

Temperature-Aware Analysis Flows and their Use Models

Figure 5:
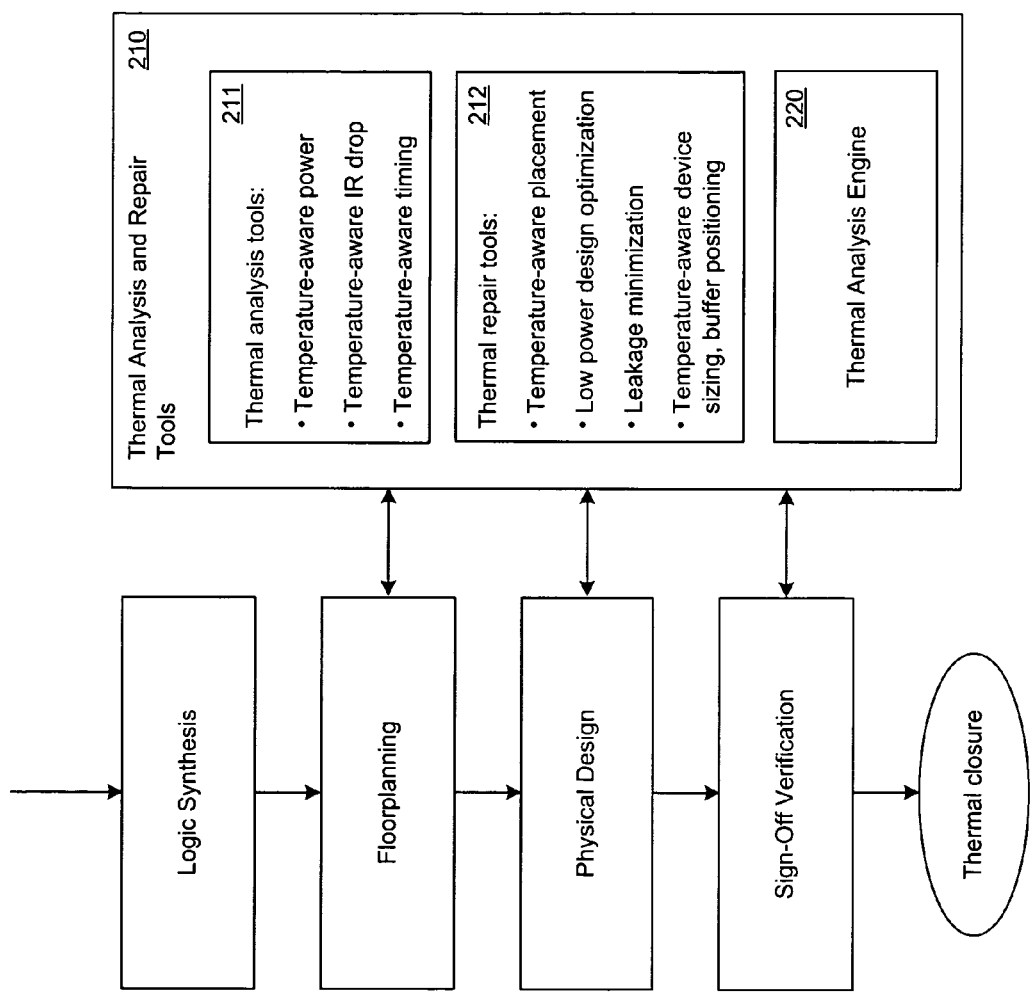
FIG. 5 illustrates integrating thermal awareness into existing design flows.

This section describes how current power analysis, voltage drop analysis, and timing analysis flows can be made temperature aware. These steps apply at various stages of a design flow as can been seen from FIG. 5 which shows a exemplary but not limiting digital design flow and the usage of temperature aware analysis within the flow. FIG. 5 also shows where repair capabilities can be applied within the design flow. The section after this will focus on the details of repair methods.

Figure 6A:
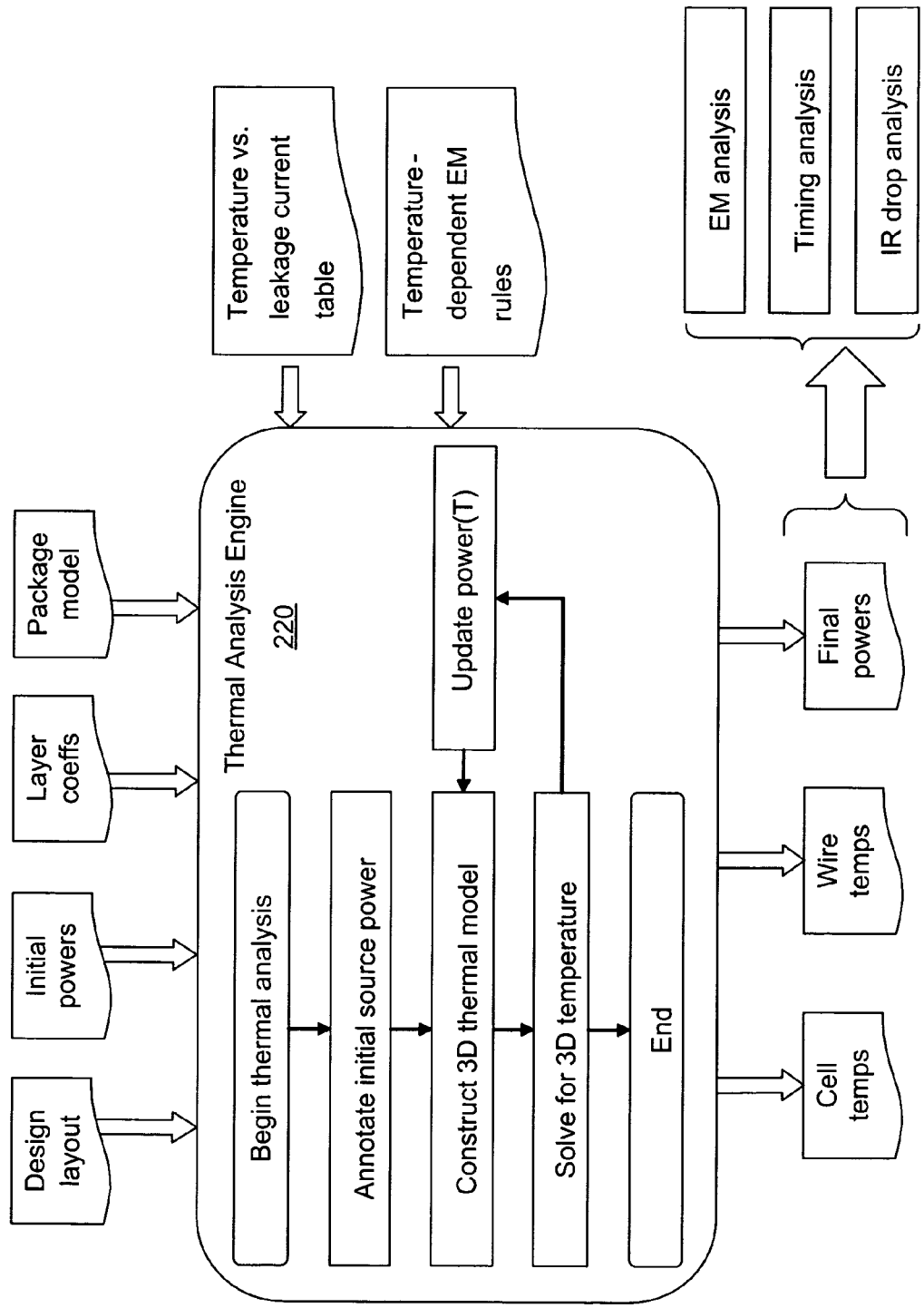
FIG. 6 illustrates detail of the thermal analysis engine of FIG. 5.

FIG. 6A illustrates the inputs, outputs, and internal actions of the thermal analysis engine of FIG. 5. An initial power estimate is derived and a three dimensional thermal model of the chip is constructed from the design layout, layer thermal coefficients, and a thermal model of the package. The thermal model is then used to solve for the temperature of the cells and wires of the chip in three dimensions. The calculated chip temperatures are then used to refine the power estimate. As suggested by the inner loop, this process repeats until the calculated chip temperature settles to a final value. The final power calculation is subsequently passed to electromigration analysis, timing analysis, and IR drop analysis tools to check for problems warranting improvement or repair.

Figure 6B:
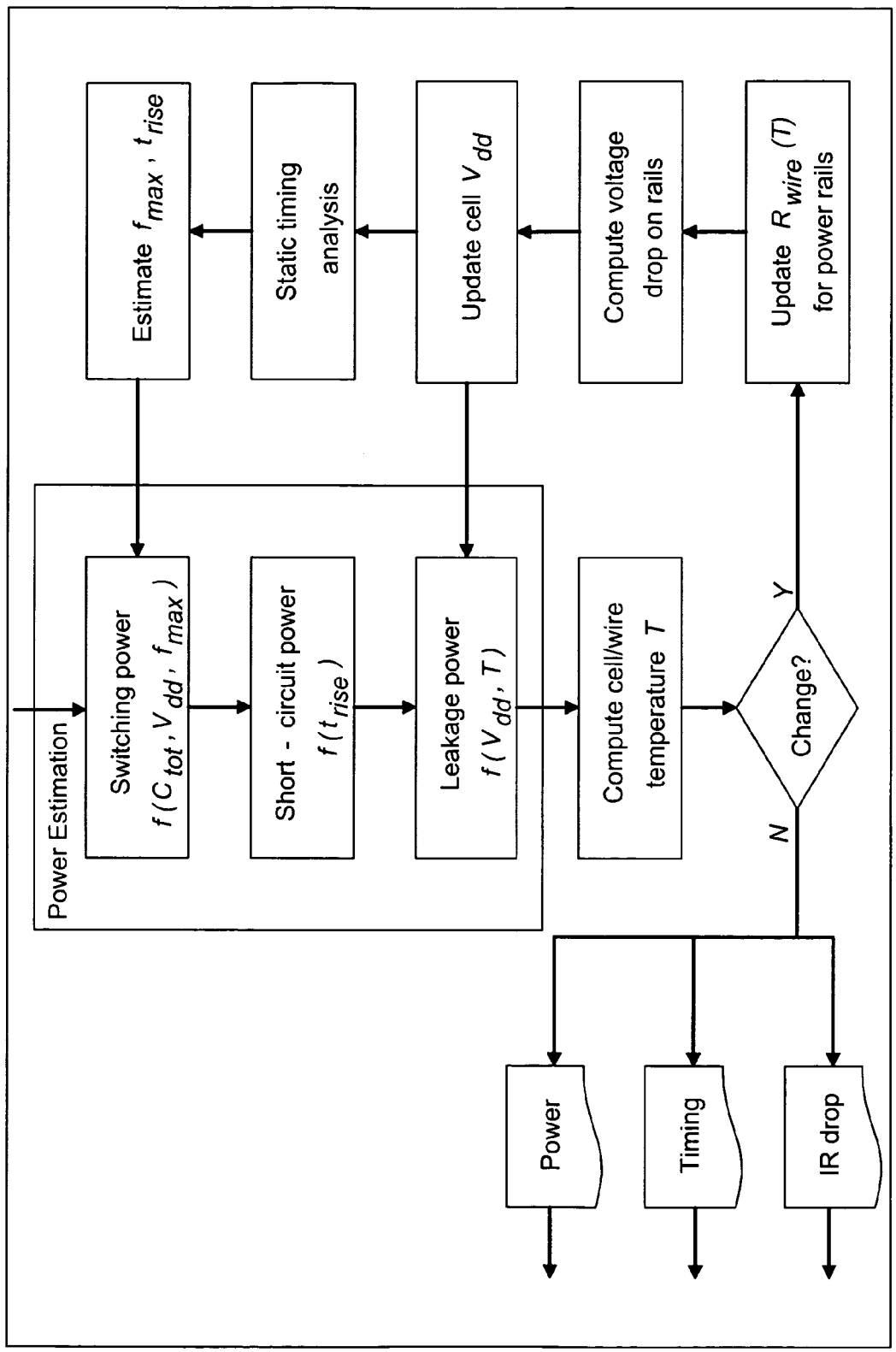

FIG. 6B provides greater detail of the inner loop of the thermal analysis engine. The thermal model is used to compute the cell and wire temperatures from the current power value. As suggested by the decision block at the bottom center, as long as changes in the computed cell and wire temperatures have not settled out, the leakage and switching power are iteratively recalculated as a function of the updated temperature. The loop is exited and the iteration stops once the computed cell and wire temperatures settle out.

Figure 7:
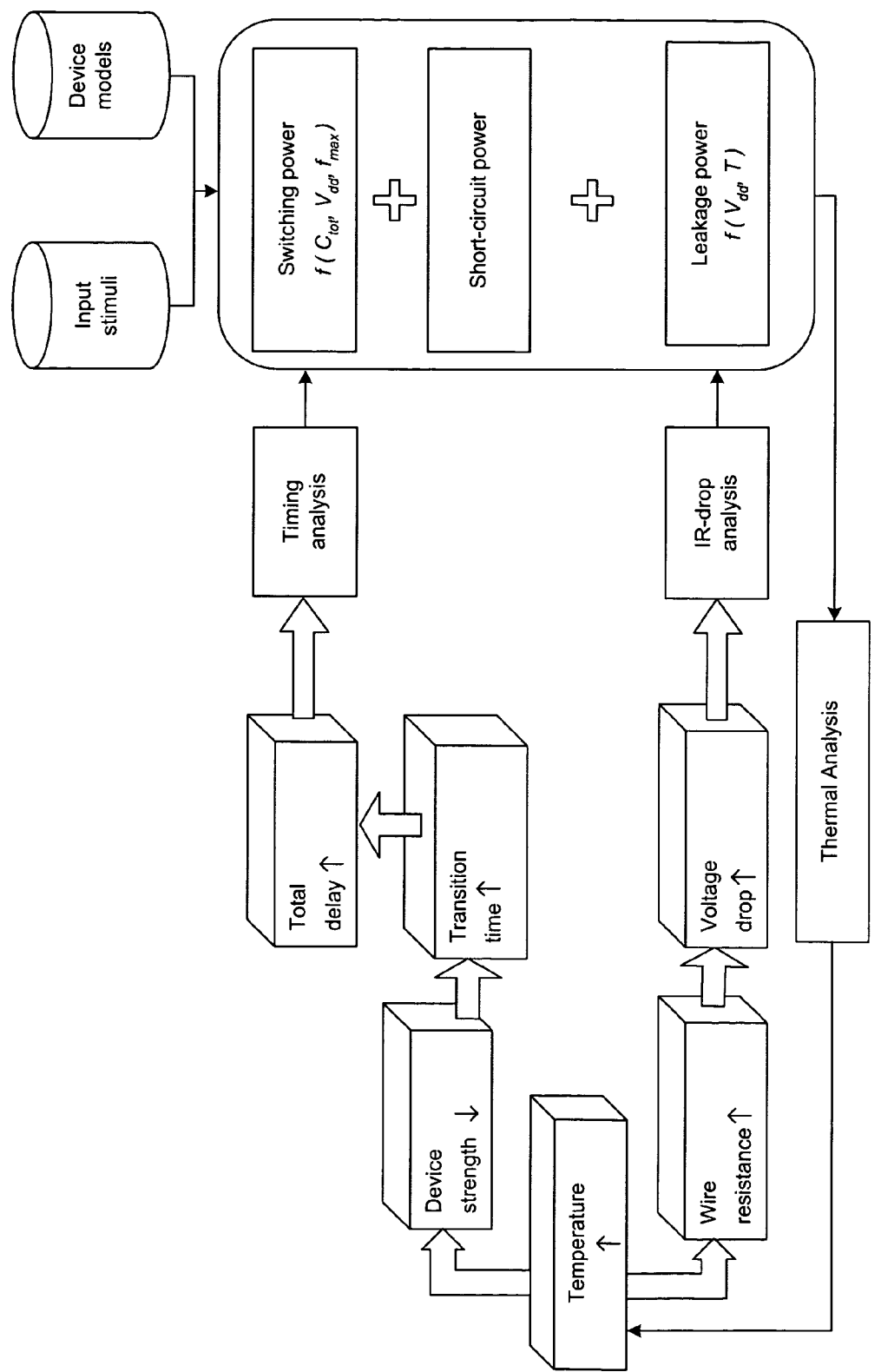
FIG. 7 illustrates temperature aware power analysis.

FIG. 7 revisits the power calculation loop of FIG. 6B from a different perspective and provides insight as to how the computed temperature data effects the power calculation components. The Thermal Analysis engine generates the temperature data. Starting with an initial power estimate of the power sources in the channel layer (corresponding to the current carrying channel layer of the active devices) and the layout information for the chip, it then computes the temperature as a function of the power dissipated per unit volume within the chip. The position and geometry of the placed instances are needed to determine the power source models and their interactions. The boundary conditions at the power source locations, interlayer dielectric interfaces, metal layers and the package boundary interface are used in numerically solving for the temperature values within the chip. The temperature data per instance and metal shape is used to update the power distribution. Iteratively solving the electro-thermal effects produces the steady-state solution to the temperature distributions. If there are any thermal runaway conditions, then that is also detected through the electro-thermal solution of the chip temperature distribution. The engine is both high capacity and high performance to cope with large-scale designs, and design analysis with several power consumption scenarios.

The initial power of the instances is used as the starting point, and the thermal analysis then electro-thermally computes the steady state power and temperature for the entire chip in three dimensions. The temperature data is used to derive the actual voltage drop and leakage current and then to update the power and the Joule heating in the wires and the corresponding resistivity changes. The steady state temperature is used to compute the actual device drive strength and delays, and then to annotate the local incremental delay (as in SDF) in to the static timer so that the slew and delays can be applied to re-compute the short circuit power and dynamic power with altered effective load capacitance.

Power analysis is applied in the post physical synthesis phase when the instance positions are known and the individual switching information and output load is available.

Figure 8:
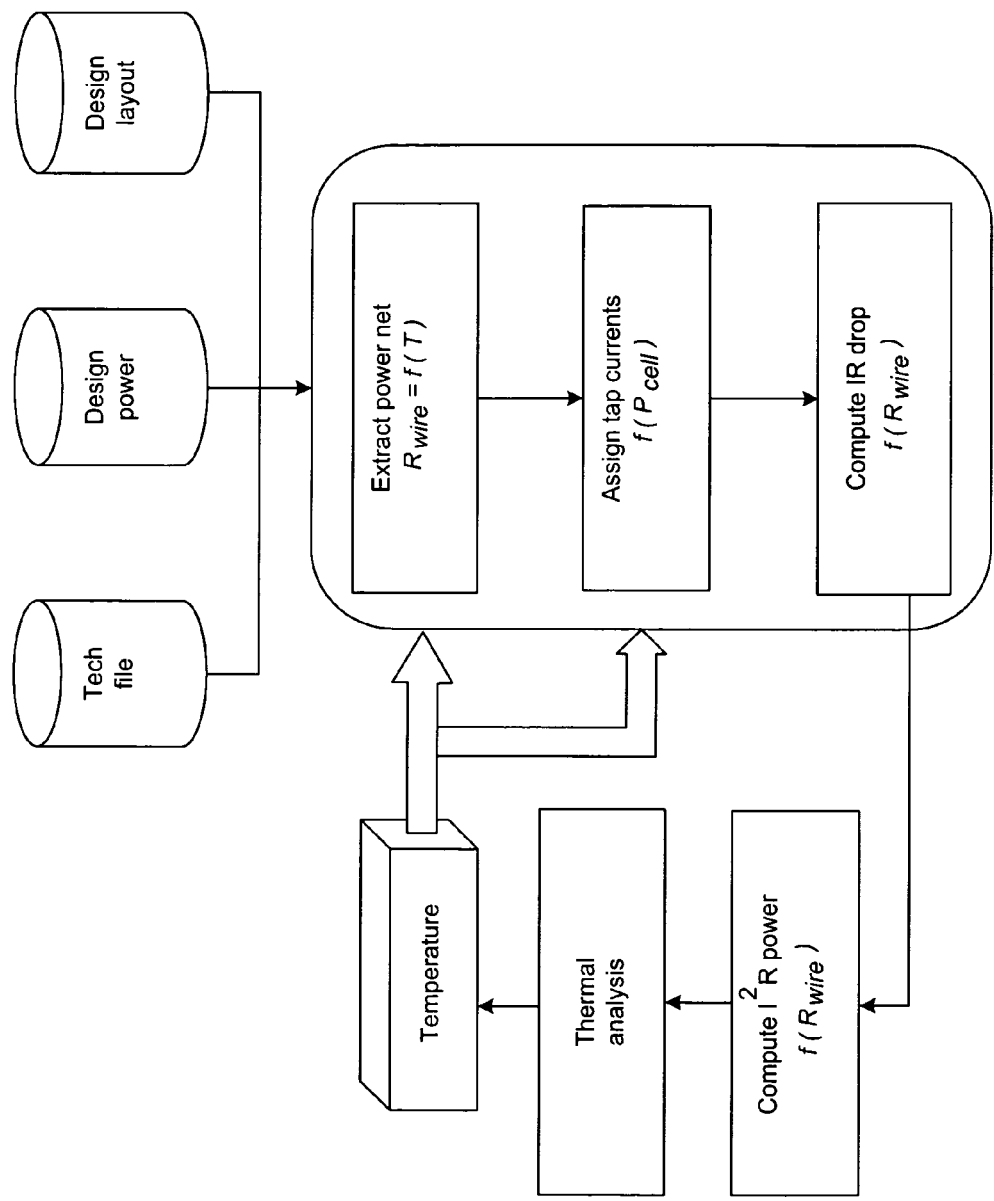
FIG. 8 illustrates temperature aware voltage drop analysis.

A method for temperature-aware voltage-drop and electromigration checks can be implemented using the thermal analysis engine described previously. In this method, the incremental changes caused by temperature difference between actual versus average temperature are considered with respect to the wire current density. The changes are due to the incremental changes in device current and wire resistances. Both the voltage drop and the current density are then compared against their respective design limits, which are temperature-dependent as well. Such temperature dependent leakage current and current density rules are established by working with the semiconductor manufacturers targeted for the fabrication of the respective designs. FIG. 8 illustrates a temperature-aware voltage drop flow.

The temperature-aware power values derived in FIG. 7 are used in obtaining temperature-aware device currents. The current values are used to derive the wire temperature due to the wires' self-heating, and the temperatures of the wire segments are used in changing the resistance of the power bus.

The flow is applicable following the physical synthesis and post power bus routing. It is intended for use at physical design planning time and after the detailed routing step for final verification.

Figure 9:
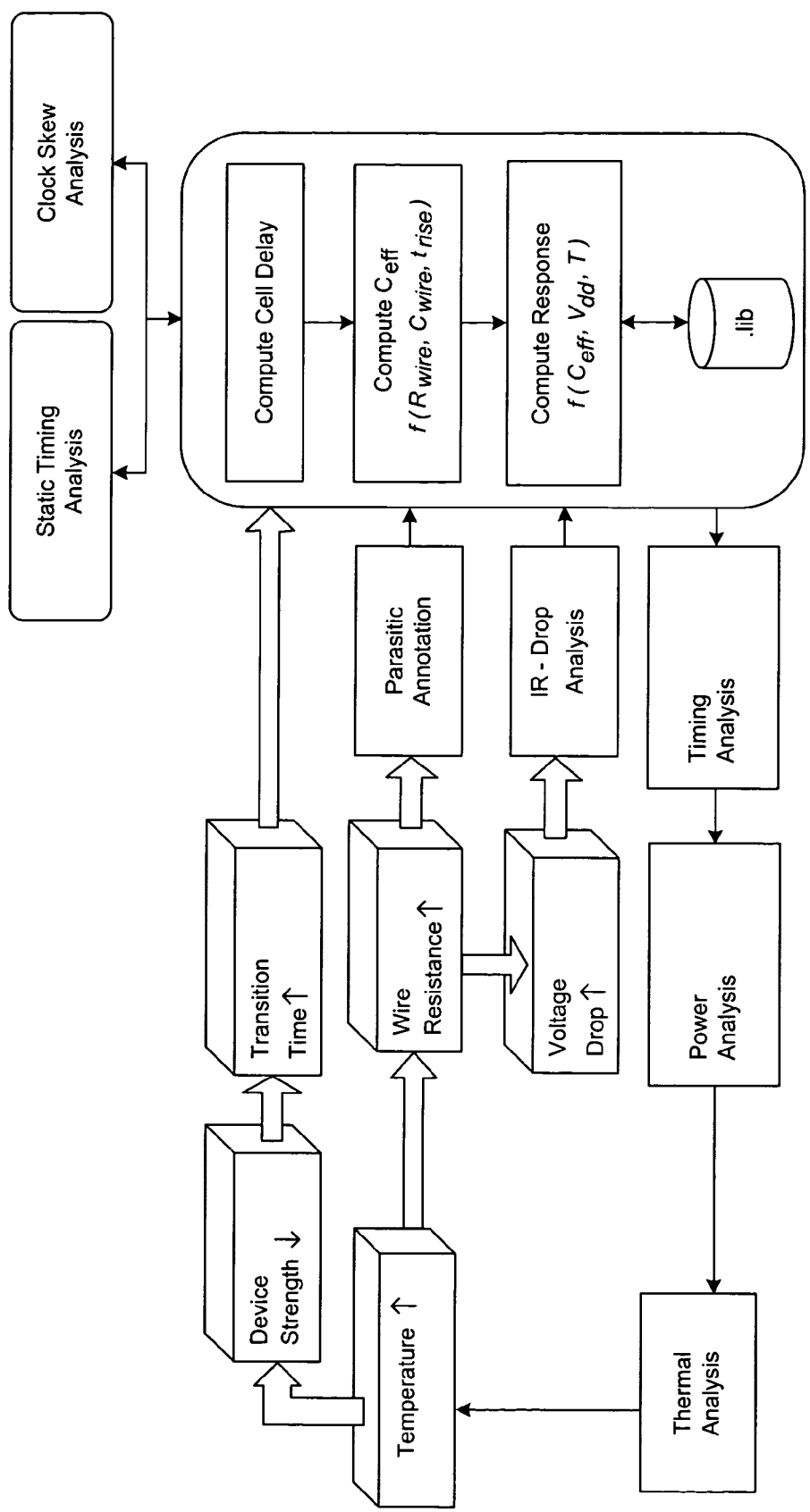
FIG. 9 illustrates temperature aware timing analysis.

FIG. 9 shows a temperature-aware timing analysis flow. Parasitic extraction and delay calculation is done in two passes. In a first pass, parasitics and delays are calculated at the average temperature condition of the chip. In a second pass, interconnect resistance and cell delays are scaled based on the thermal gradients. The standard parasitic (SPEF) and delay (SDF) formats are used to implement this flow. In this way, existing tools and methods for the calculation of timing and signal integrity are leveraged. The overhead of post-processing SPEF and SDF files to include the thermal effects is small compared to the overall analysis time. The output from the tool is the incremental delay due to the difference in the average temperature versus the actual device temperature and the signal wire temperature profile. This result is expressed in the incremental SDF format so that static timing analysis tools can directly use it.

The flow can be used directly after routing of clock and signal nets in the physical design steps and in the final routing stages when the coupling capacitance and signal integrity effects can be fully included. By integrating temperature aware capabilities into today's design flows, there is no need to re-write the golden analysis standards that have been established for the past decade. Instead, through the use of tools which incrementally retrofit today's flows with temperature aware data, the temperature effects can be fully accounted for.

By applying thermal analysis, pessimism and/or risk associated with the assumption of a uniform on-chip temperature is reduced. A temperature-aware design flow is useful for existing technologies down to 90 nm, and is required for technologies below 90 nm. The next section addresses the methodology for repairing the issues that could arise because of temperature gradients within the chip.

Thermal Integrity: Analysis and Repairing of Temperature Induced Problems

In this section the thermal analysis of the previous section and repair strategies for addressing thermally induced chip design issues are combined to provide a complete solution for modern day chip designs.

In the foregoing discussions, it was pointed out that the thermal analysis requires the placed instances and their bounding boxes. The instances can be represented as power sources with different levels of granularity (transistor, cell, macro, block). The thermal conduction through metal layers can be either estimated or accurately calculated depending on the details of the routed geometries. The analysis with coarse granularity and estimated thermal conduction though metal layers corresponds to a floor plan scenario, whereas the detailed analysis corresponds to a post-route scenario.

Assuming an integrated circuit comprising several million standard cells, thermal analysis for the floor plan scenario can be performed in roughly an hour. This is fast enough to allow for floor plan and placement iterations with the goal of avoiding undesirable effects due to thermal gradient. The detailed analysis for the post-route scenario of the same circuit takes much longer. While the analysis at the floor plan stage is accurate enough to find the location and the relative magnitude of thermal hot spots, the post-route analysis allows the designer to verify timing and signal integrity with greater accuracy and therefore reduce pessimistic design margins. It is possible, and in many cases desirable, to use non-worst-case margins and allow the temperature-aware design flow to identify any resulting issues, which can then be fixed individually. This approach is most beneficial for cost-sensitive applications where overly-conservative margin left in the design corresponds to increased silicon area.

The analysis data at the early stages is useful in removing hot spots and in equalizing the temperature distribution. Consequently, the subsequent steps, in the design implementation progressively occur with less steep thermal gradients. This helps standard implementation tools with internal analysis capability to operate closer to the constant temperature premise, allowing their existing optimization and analysis algorithms to be applicable. The temperature profile and the distance of the power source from the surrounding temperature contours provide cost functions which can determine several placement options for a given temperature gradient tolerance. The package characteristics are taken into account to ensure that the temperature contours are realistic.

Figure 10:
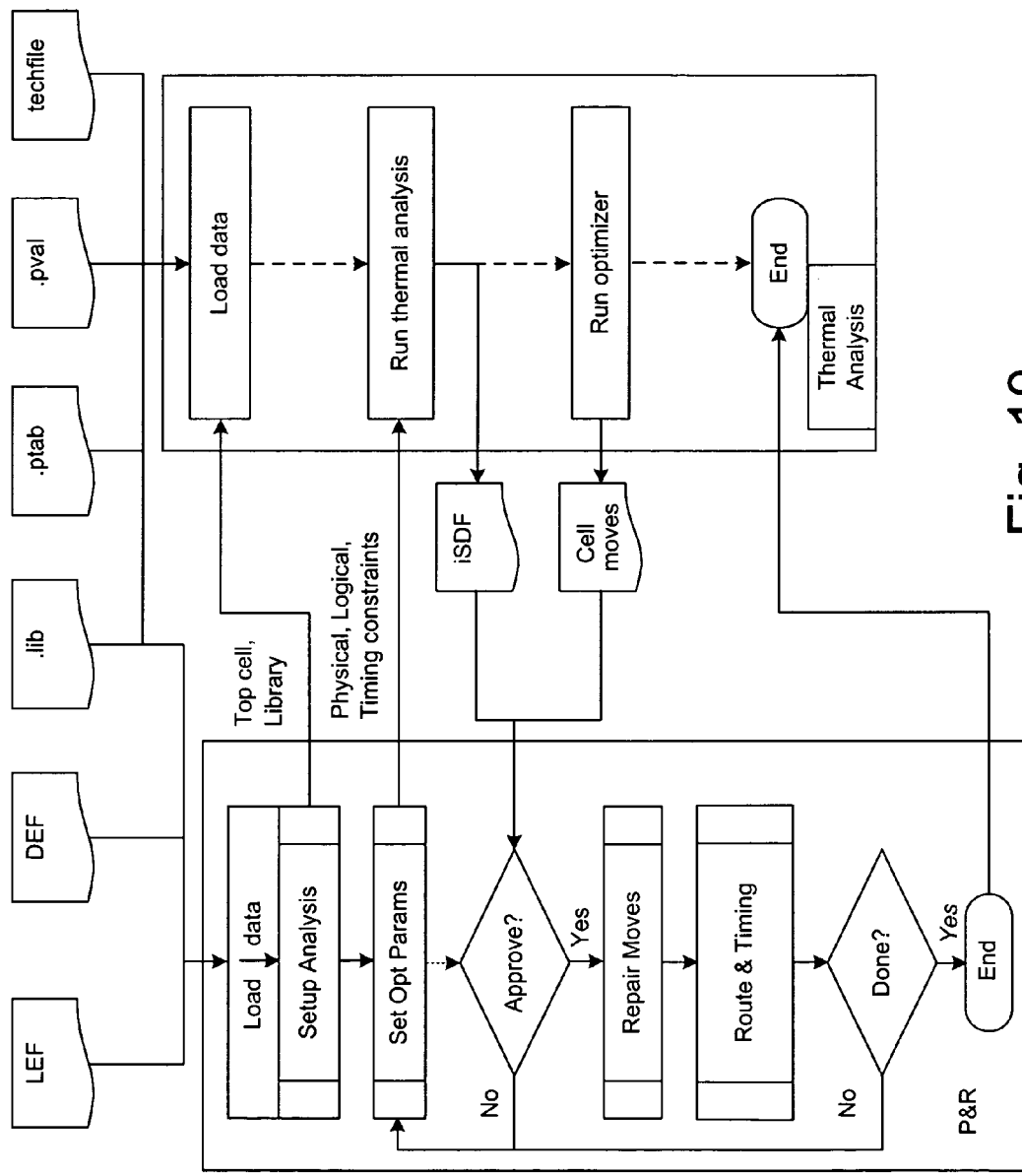
FIG. 10 illustrates an example flow for temperature aware cell placement.

An example flow showing a temperature driven cell placement is shown in FIG. 10. The thermal analysis function is called from within the physical design (P&R) tool to initiate temperature calculations and to get information on possible cell moves that would minimize the temperature gradients within the chip. The thermal analyzer identifies cell instances and moves that best optimize the temperature gradients under the given constraints. It then sends the location and move request to P&R for approval. This loop iterates with further constraint data to check if there are any violations in P&R until an approval is signaled to the thermal analysis tool, after that point the temperature-aware cell moves are implemented by P&R.

The ptab input file contains instance positions passed to the thermal tool by the physical implementation tool. The pval input file contains instance power values given to the thermal analysis tool from a power estimation tool (which often comes integrated into the P&R tool). The techfile input file contains layer dimensions, material constants, package characteristics and ambient temperature information.

Parasitic information and static timing analysis results are available through P&R and temperature aware delay calculation is available within the thermal analysis tool similar to the flow described in FIG. 9.

After the final routing and temperature aware timing analysis is completed, if there are any more temperature hot spots the thermal analysis tool applies further repair actions using thermal structures to further minimize temperature gradients, and the flow is then completed with the optimal temperature distribution for the given design and package parameters.

Figure 11:
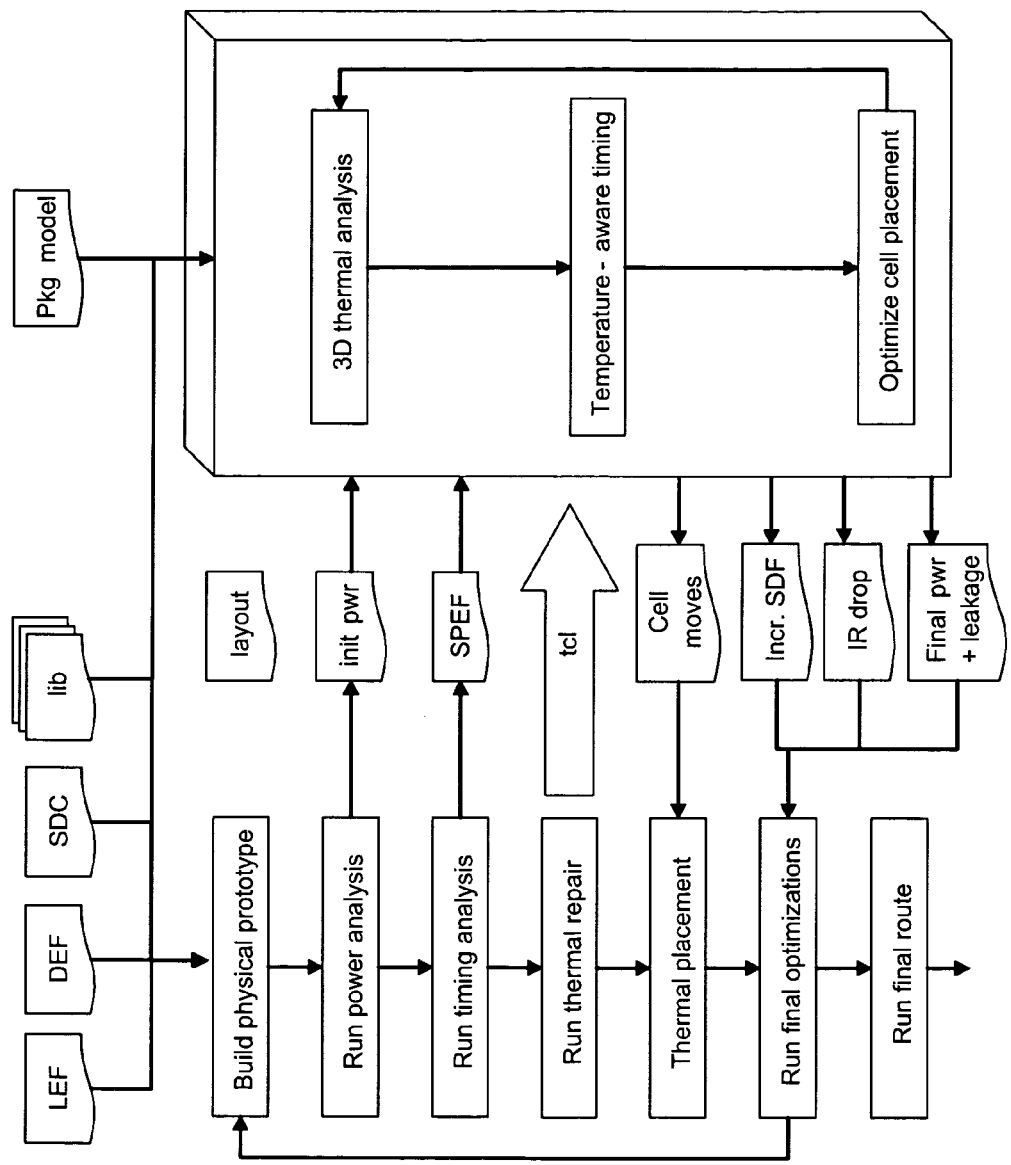
FIG. 11 illustrates another example flow for temperature aware cell placement.

FIG. 11 is an alternative perspective of the example flow for temperature aware cell placement of FIG. 10, drawn to emphasize the various data types passed the thermal analysis engine.

Design Improvement Flow

Figure 12:
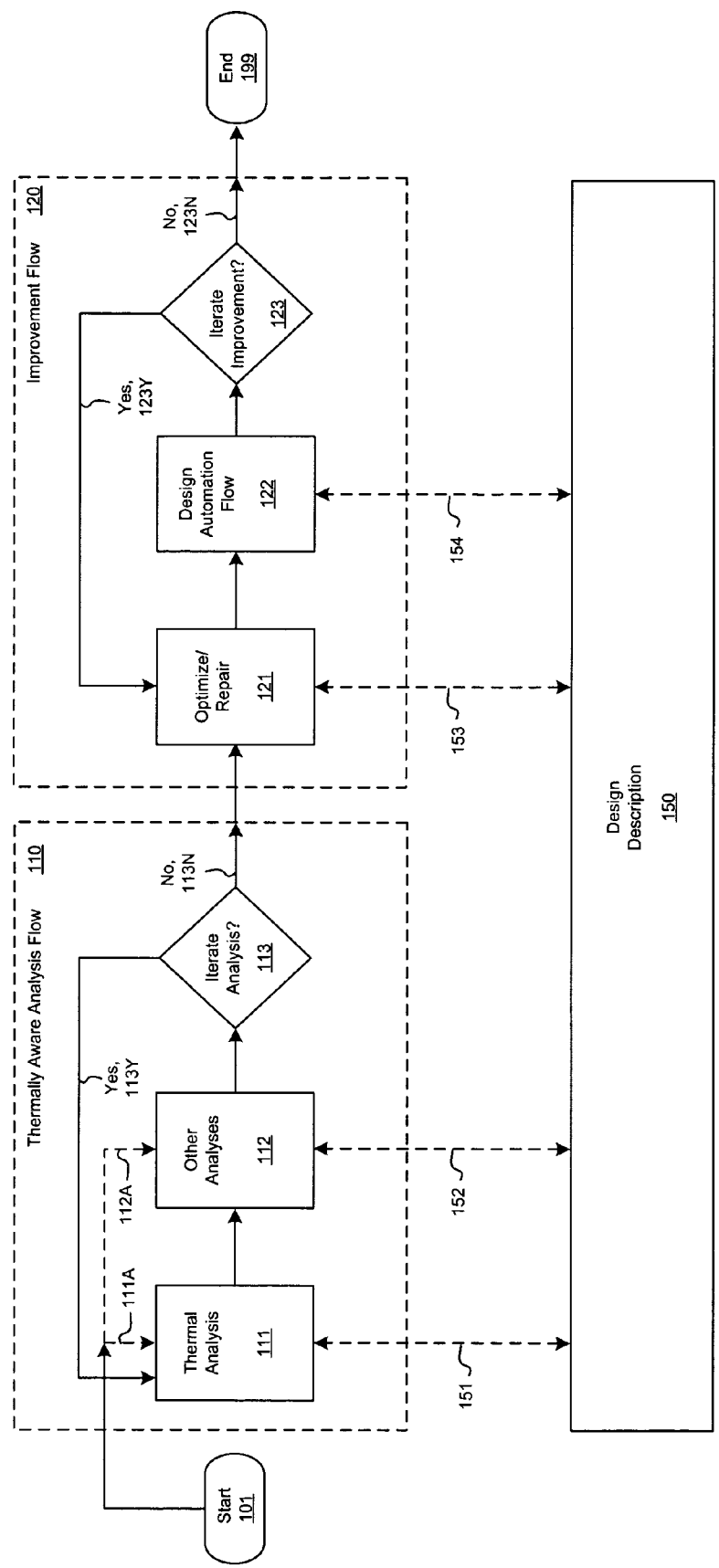
FIG. 12 illustrates an embodiment of a flow diagram for improving electronic component design by incorporating thermally aware analysis.

FIG. 12 illustrates an embodiment of a flow diagram for improving electronic component design by incorporating thermally aware analysis. As illustrated in the figure, the flow generally includes two phases. A first phase includes an iterative analysis of the electronic component accounting for thermal effects ("Thermally Aware Analysis Flow" 110). A second phase includes an iterative improvement of the design of the component ("Improvement Flow" 120), using information from the thermally aware analysis.

"Design Description" 150 is a collection of information defining various aspects of the particulars of the specifications for manufacturing and using the electronic component that is to be improved, including logical, physical, and mechanical descriptive data. Typically the electronic component is an integrated circuit that includes any combination of one or more monolithic die, a package for the die, an attachment mechanism to couple (electrically and mechanically) the die to the package, and heat dissipation elements. In some embodiments, the description is in the form of computer-readable files including any combination of a technology file, an extracted parasitic netlist file, timing constraints files, device and interconnect information files (such as geometry, orientation, and location information files), and average power files (from simulation or designer input). "Thermally Aware Analysis Flow" 110 and "Improvement Flow" 120, each with iterative processing, may optionally communicate information between each other and internal elements via the description, as illustrated conceptually by dashed-arrows 151-154, according to various embodiments.

More specifically as illustrated by the figure, flow beings ("Start" 101) and an analysis of the electronic component is performed, accounting for thermal properties and resultant behaviors ("Thermally Aware Analysis Flow" 110), with optional iterations. Results of the thermal analysis include expected operating temperatures (absolute or gradient) for various portions of the electronic component, including any combination of the die, the package, the die attach mechanism, and the optional heat sink.

Subsequently the electronic component design is improved ("Improvement Flow" 120), using information from the thermally aware analysis flow, also with optional iterations. Flow is then complete ("End" 199). The entire illustrated flow, from the start to the end may be repeated as desired, under the direct control of design personnel or programmatically, according to embodiment.

The thermally aware analysis flow begins by analyzing or simulating the thermal behavior of the electronic component design ("Thermal Analysis" 111), based in part on portions of "Design Description" 150. Output results include expected operating temperatures for various elements of the die, including various devices and interconnect. The results may also include a thermal diagram or temperature gradient map, indicating equi-thermal lines of identical temperature superimposed on a representation of the physical or mechanical layout of portions of the electronic component. Alternatively, a listing of elements and respective temperatures may be provided in a tabular format. Any combination of the results may be provided in human-readable and computer-readable representations Processing then proceeds with analyses according to procedures typically relying on the operating temperatures of the various elements as inputs ("Other Analyses" 112). In other words, the other analyses use temperature information provided by the thermal analysis to perform other operations, varying by embodiment and including circuit and logic simulation, as well as static timing analysis (STA). The other analyses further include signal integrity analyses, leakage current checking, and electrical rules checking. In some embodiments the circuit simulation is performed via any combination of industry standard tools such as SPICE, HSPICE, and HSIM. In some embodiments the logic simulation is performed via an industry standard Verilog compatible simulator. In some embodiments the STA is performed via an industry standard tool such as PrimeTime. Varying by embodiment, the signal integrity analyses include analyzing data signals, clock lines, and power grids, often using industry standard tools such as VoltageStorm and CeltIC. The electrical rules checking includes any combination of slew rate, current density, and electromigration checking, according to various embodiments.

After completing the other analyses, a determination is made as to whether additional thermal and other analyses are required ("Iterate Analysis" 113). If additional iterations are required ("Yes" 113Y), such as due to results of the other analyses indicating heat output from devices that is different than what was assumed prior to the thermal analysis, then flow returns to "Thermal Analysis" 111. If additional iterations are not required ("No" 113N), then the thermally aware analysis flow is complete, and flow continues, using the results of the analysis to improve the design ("Optimize/Repair" 121).

The optimize/repair processing examines the results of the thermal and other analyses to determine ways to improve the design of the electronic component. Improvements take the form of any combination of optimizations, repairs, and similar techniques to enable better performance of an instance of the electronic component manufactured according to portions of "Design Description" 150. Examples of selected improvement techniques are described elsewhere herein (see the "Example Improvement Techniques" section). Outputs of "Optimize/Repair" 121 include any combination of violation reports for inspection by design personnel, Engineering Change Order (ECO) scripts for input to design automation tools, and similar data for improving the design of the electronic component, according to various embodiments.

In some embodiments the ECOs are passed programmatically directly for use by "Design Automation Flow" 122. In some embodiments design personnel inspect the ECOs and selectively pass all or portions of them to the design automation flow. Typical implementations of the design automation flow include operation of one or more industry standard (or industry standard compatible) Computer Aided Design automation (CAD) tools using as input at least the ECOs and selected information from "Design Description" 150. The CAD tools typically include any combination of logic synthesizers, netlist generators, place and route tools, layout extractors, and other similar procedures to develop aspects of the physical implementation of the electronic component.

After completion of the design automation flow, a check is made to determine whether additional optimization/repair and design flow operations are necessary ("Iterate Improvement?" 123). If additional iterations are required ("Yes" 123Y), such as due to not meeting some of the optimize/repair specifications, then flow returns to "Optimize/Repair" 121. If additional iterations are not needed, then the improvement flow is complete, and flow continues via "No" 123N to "End" 199. In some embodiments checking for the need for additional operations ("Iterate Improvement?" 123) may be performed by design personnel, design programs, or both.

In some embodiments "Thermal Analysis" 111 provides thermal information to "Other Analyses" 112 via modifications to models referenced by the other analyses. For example, timing delay models used by an STA executed during the other analyses may be modified by the thermal analysis to reflect effects of operating temperatures (typically hotter devices operate longer propagation times while cooler devices operate with shorter propagation times). Similarly, power models read by a power grid analyzer may be modified according to results of the thermal analysis (typically hotter transistors have higher leakage currents and cooler transistors have lower leakage currents). As another example, interconnect properties used by an electromigration checking tool may be modified based on temperatures of operation of interconnects determined by the thermal analysis (higher temperatures generally being modeled as having greater susceptibility to electromigration effects).

In some embodiments "Thermal Analysis" 111 provides thermal information to "Other Analyses" 112 via differential (or incremental) parameter changes with respect to a fixed operating temperature point, conceptually similar to a "small-signal analysis" around the temperature point. Frequently implementations of elements of "Other Analyses" 112 (such as analyzers for timing, voltage drop, power, electromigration, and noise) perform an analysis at an assumed constant temperature (one of minimum, maximum, or nominal, for example). In other words, the analysis is performed as if all of the analyzed elements operated at the same temperature. However, results of the thermal analysis typically indicate operation of the analyzed elements at varying temperatures. In some of the fixed-temperature analysis implementation contexts "Thermal Analysis" 111 provides incremental data to facilitate a more accurate analysis that accounts for the determined temperature gradients.

Several illustrative examples serve to further describe the incremental analysis technique, as follows. The thermal analysis provides the timing analyzer with incremental delay information based on computed temperature variations. The incremental delays represent differences in propagation behavior between operation at the assumed temperature point and the temperature point determined by the thermal analysis. The voltage drop analyzer is provided with differential voltage drop information computed in accordance with the thermal analysis. The power analyzer is provided power variance information as relating to variation of leakage power with respect to the temperatures provided by the thermal analysis. The electromigration analyzer rule check is modified according to differences (above or below) assumed temperature operation of interconnect (signal, clock, supply, and so forth) according to thermal analysis results, including more stringent rules for elevated temperatures and correspondingly more relaxed rules for reduced temperatures. The noise analyzer is provided with information regarding signal waveform variation as a function of temperature according to the thermal analysis, the variation being obtained by a technique such as annotations of temperature variation in a circuit simulation.

In some embodiments portions of "Other Analyses" 112 may be incorporated into "Thermal Analysis" 111, optionally including iterations similar to "Iterate Analysis" 113. For example, an iterative logic/timing simulation may be performed that dynamically accounts for operating temperatures of various devices of the electronic component by accounting for localized heat generation due to dynamic switching activity. Similarly, a power grid analysis may be performed that feeds back power estimation information to an incorporated/integrated thermal analysis to determine new operating temperatures for devices. In turn thermal analysis results are input to a revised power grid analysis.

In some embodiments "Optimize/Repair" 121 relies on information from ("Other Analyses" 112. For example, an optimization or a repair may introduce a new timing problem or create a design rule violation. The optimize/repair processing selects a strategy based on any combination of the thermal analysis and the other analyses to avoid introducing new errors.

As illustrated, the thermally aware analysis is not restricted to beginning with a thermal analysis (dashed-arrow 111A). Instead processing may begin with other analyses (dashed-arrow 112A), under control of design personnel directives, programmatic selection, other determination schemes, or according to various embodiments. For example, in some embodiments it may be desirable to perform an initial logic simulation to determine activity factors (or fractional switching duty cycles) in preparation for the thermal analysis. The activity factors are used to provide information regarding heat source behavior, as transistors and interconnect (including resistive, capacitive, and inductive effects) typically dissipate more power (as heat) when changing state more often. For another example, in some embodiments it may be useful to perform an initial leakage analysis to estimate leakage power (having an exponential temperature dependence) in preparation for the thermal analysis. The leakage estimate is used to provide information regarding heating due to the elements dissipating the leakage power.

Example Improvement Techniques

In the following example improvement techniques, it will be understood that each illustrated cooling structure (a.k.a., heat removal element) is merely an abstraction for one or more of the heat dissipation and spreading design choices disclosed throughout this specification (including the claims as filed). To repeat just some of these techniques here: vias, solder bumps, metal fills, final metal pads/lands, wire width, and bond wires, can be introduced or modified to dissipate and/or spread heat to reduce, equalize, and/or smooth the temperature distribution in a local area. Likewise, it will be understood that the heating structure (a.k.a. heat source) illustrated in the last example is merely an abstraction for one or more design choices (as taught throughout the specification and claims) that result in a temperature increase in the desired local area. For example, a higher R metal can be chosen for a wire proximate to the local area, a nearby transistor can be resized, or the density of proximate solder bumps or heat sink fins can be decreased. Both types of thermal structure (cooling and heating) can furthermore be achieved at least in part through the technique of substitution of otherwise functionally interchangeable elements that are differentiated by differences in their thermal conductivity. That is, the temperature distribution in a local region can be modified as desired at least in part by choosing the most appropriate available thermal conductivity type for structures and/or components in the region of interest.

FIG. 13 illustrates an example of a hold time problem made apparent by thermally aware analysis (such as performed by "Thermally Aware Analysis Flow" 110 of FIG. 12). Cool Region 210 includes Source FFs 211, AND Gate 212, XNOR Gate 213, and AND Gate 214, all operating at a relatively low temperature, as determined by "Thermal Analysis" 111. Hot Region 220 includes Destination FF 221 and in close physical proximity, Heat Source 222, all operating at a relatively high temperature, as determined by "Thermal Analysis" 111. The elements of Cool Region 210 operate with relatively small delays, due at least in part to their relatively low operating temperature. Destination FF 221 operates with relatively large delays, due at least in part to its relatively high operating temperature, and the larger delays result in the FF requiring a relatively longer hold time to capture an input.

"Thermal Analysis" 111 provides the STA (typically performed as part of "Other Analyses" 112) with information describing the temperature affected relative timing performance between Cool Region 210 and Hot Region 220. The timing performance information may be explicit or implicit, according to embodiment. Explicit information typically takes the form of delay differentials or deltas, with respect to an assumed temperature operating point used by the STA. Implicit information is typically absolute or differential temperatures used by the STA to compute delay times accounting for temperature gradients. The STA recognizes that due to the relatively small delay of the path through Cool Region 210, in conjunction with the relatively longer hold time requirement of Destination FF 221, that there is a hold time problem in the path from Source FFs 211 to Destination FF 221. The detected hold time violation occurs under the conditions of the temperature gradient recognized by "Thermal Analysis" 111.

FIG. 14 illustrates an example repair technique for the hold time problem of FIG. 13, as provided by thermally aware design improvement (such as performed by "Improvement Flow" 120 of FIG. 12). More specifically, FIG. 14 illustrates improving the hold time performance of Destination FF 221 by reducing its operating temperature as a repair for the hold time violation. However, in this example a heat removal element is added, via insertion of Cooling Structure 332, in close physical proximity to Destination FF 221. The elements of FIG. 14 are identical to those of FIG. 13, except for the addition of the cooling structure. As illustrated, the area of relatively lower temperature operation (Cool Region 210C) extends to include Destination FF 221, due to the addition of the cooling structure. The region of relatively higher temperature operation (Hot Region 220C) is correspondingly reduced in area. In this example, "Thermal Analysis" 111 identifies the heat source and "Optimize/Repair" 121 recognizes opportunity for improvement by decreasing the effect of the heat source on the FF by adding the heat removal element.

Figure 15:
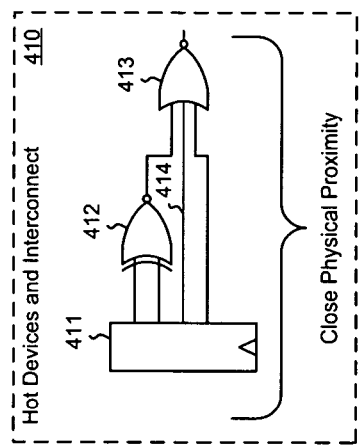
FIG. 15 illustrates an example of performance or reliability problems caused by high operational temperatures as recognized by thermally aware analysis.

FIG. 15 illustrates an example of performance or reliability problems caused by high operational temperatures as recognized by thermally aware analysis (such as performed by "Thermally Aware Analysis Flow" 110 of FIG. 12). Hot Devices and Interconnect 410 includes Source FFs 411, XNOR Gate 412, NOR Gate 413, and Interconnect 414, in close physical proximity and all operating at a relatively high temperature, as determined by "Thermal Analysis" 111. The performance problems due to the elevated temperature may include increased leakage current (from the transistors in the FFs and Gates, for example), reduced current handling capability (in the interconnect, for example), or both. The reliability problems due to the higher temperature may include accelerated electromigration effects such as via damage and wire cracking, in any combination of the FFs, Gates, and interconnect.

In some embodiments "Thermal Analysis" 111 provides the electrical rules checking tool typically executed as part of "Other Analyses" 112 with temperature profile information for the elements of Hot Devices and Interconnect 410. The electrical rules checker recognizes the performance or reliability problems due to the high temperature operation. In some embodiments "Thermal Analysis" 111 provides the checking tools with modified rules that take into account operating temperatures of analyzed elements. For example, a rule for checking a power line routed near a large heat generator (and thus operating at a relatively higher temperature) may be made more stringent than a rule for checking a ground line routed far from heat generators (and thus operating at a relatively lower temperature).

Figure 16:
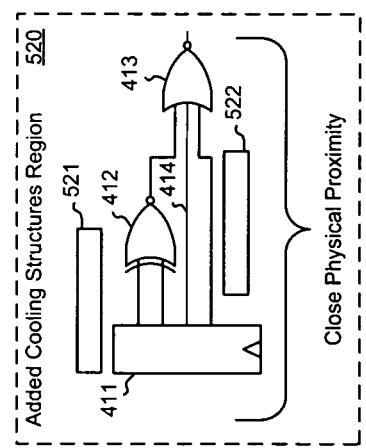
FIG. 16 illustrates an example repair techniques for the performance and reliability problems of FIG. 15, as provided by thermally aware design improvement.

FIG. 16 illustrates an example repair techniques for the performance and reliability problems of FIG. 15, as provided by thermally aware design improvement (such as performed by "Improvement Flow" 120 of FIG. 12). More specifically, FIG. 16 illustrates an example for improving the performance and reliability of Hot Devices and Interconnect 410 by insertion of cooling structures to reduce operating temperatures. The elements of FIG. 16, as illustrated by Added Cooling Structures Region 520, are identical to those of FIG. 15 except for the addition of heat removal elements Cooling Structure 521 and Cooling Structure 522. The cooling structures decrease operating temperatures and thus effect improved performance and reliability, as in the previous example. Requirements on the nature and location of the heat removal elements are provided by "Optimize/Repair" 121 to "Design Automation Flow" 122 to implement improvements of an electronic component including functionality as specified by Hot Devices and Interconnect 410.

Figure 17A:
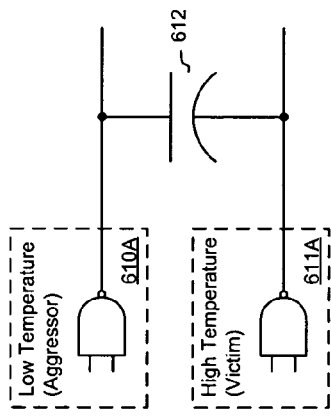
FIG. 17A illustrates an example of a noise problem brought about in part by a steep thermal gradient that is recognized by thermally aware analysis.

FIG. 17A illustrates an example of a noise problem brought about in part by a steep thermal gradient that is recognized by thermally aware analysis (such as performed by "Thermally Aware Analysis Flow" 110 of FIG. 12). Low Temperature (Aggressor) 610A affects High Temperature (Victim) 611A via Coupling Capacitance 612. In a failure mode, as the Victim output is being sampled by a storage element, the Aggressor switches at a high slew rate, coupling a transient to the Victim output and causing a sampling error. The error is magnified by the thermal gradient, as the Aggressor slews more quickly due to operation at a relatively low temperature, while the Victim recovery slew rate is slower due to operation at a relatively high temperature. In some embodiments temperature profiles, as determined by "Thermal Analysis" 111 and provided to the noise analysis performed by "Other Analyses" 112 enable detection of the noise problem. In some embodiments temperature aware noise behavior information is provided directly by the thermal analysis to the noise analysis.

Figure 17B:
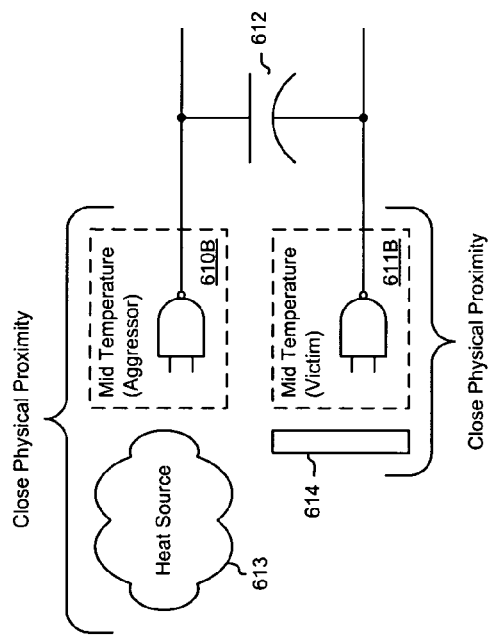
FIG. 17B illustrates an example improvement technique for the noise problem of FIG. 17A, as provided by thermally aware design improvement.

FIG. 17B illustrates an example improvement technique for the noise problem of FIG. 17A, as provided by thermally aware design improvement (such as performed by "Improvement Flow" 120 of FIG. 12). Two mechanisms are illustrated, usable alone or in combination. A first mechanism includes addition of Heat Source 613 near the Aggressor, resulting in operation at a relatively higher temperature, as shown conceptually by Mid Temperature (Aggressor) 610B. A second mechanism includes addition of Cooling Structure 614 near the Victim, resulting in operation at a relatively lower temperature, as shown conceptually by Mid Temperature (Victim) 611B. The two techniques tend to reduce the thermal gradient (i.e. provide a more uniform temperature distribution) between the Aggressor and the Victim, thus reducing the relative affect of the Aggressor on the Victim, and the noise problem is mitigated, improving the design. Computations in "Optimize/Repair" 121 and corresponding results provided to "Design Automation Flow" 122 include any combination of heat source selection and placement, as well as cooling structure selection and placement, according to various embodiments.

CONCLUSION

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications (such as the design file formats, the type of packaging, the number of metal layers, and the type and number of stages in the design flow), are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:

1. A method of computer-aided-design of integrated circuits, the method comprising:
   manipulating a design database representing at least a portion of a chip having an associated physical structure, operational temperature distribution, and operational electrical performance;
   simulating the operational temperature distribution of at least part of the chip using thermal modeling of all thermally significant features of the physical structure, the thermally significant features comprising active devices of a die and embedded multi-layer interconnect of the die and being described by the design database;
   simulating the operational electrical performance of the at least part of the chip;
   programmatically communicating information between the acts of simulating; and
   based on the acts of simulating, selectively modifying aspects of the design database in accordance with at least one predetermined criteria.

2. The method of claim 1, wherein the thermal modeling is performed in three dimensions and the temperature distribution is simulated in three dimensions.

3. The method of claim 1, wherein the selectively modifying is performed at least in part to alter the temperature distribution.

4. The method of claim 1, wherein the selectively modifying is performed at least in part to optimize at least portions of the design database in view of the temperature distribution.

5. The method of claim 1, wherein the selectively modifying is performed to enhance cooling capability proximate to at least one hot region of the chip.

6. The method of claim 1, wherein the selectively modifying is performed to equalize the temperature in at least one region of the chip by raising the temperature within at least part of the at least one region.

7. The method of claim 1, wherein the selective modification improves one or more of:
   the temperature distribution; chip performance; static power; dynamic power; maximum temperature; leakage; and chip reliability.

8. The method of claim 1, wherein the acts of simulating and the modifying are actions performed in a thermal and electrical analysis and improvement computer aided design tool adapted to function independently of other computer aided design tools.

9. The method of claim 1, wherein at least the operational temperature distribution simulating action is performed by a thermal analysis computer aided design subsystem adapted to interact with at least one other computer aided design subsystem in at least a circuit simulation stage and a floorplanning stage of an overall design flow.

10. The method of claim 9, wherein the operational electrical performance simulating is performed by the at least one other computer aided design subsystem.

11. The method of claim 1, wherein at least the operational temperature distribution simulating action is used in at least one stage in an overall design flow by a thermal analysis computer aided design subsystem adapted to interact with at least one other computer aided design subsystem.

12. The method of claim 11, wherein the at least one stage in an overall design flow comprises one or more of:
   circuit design;
   circuit simulation;
   simulation;
   floorplanning;
   place and route;
   block partitioning;
   detailed place and route;
   engineering change order; and
   sign-off.

13. The method of claim 11, wherein the at least one other computer aided design subsystem is enabled to perform one or more of:
   circuit simulation;
   floorplanning;
   place and route;
   static timing analysis;
   statistical timing analysis;
   power analysis;
   signal integrity analysis;
   electrical circuit rule checking;
   IR drop analysis;
   electromigration analysis;
   reliability analysis;
   power rail analysis; and
   clock tree analysis.

14. The method of claim 1, wherein the manipulating, the acts of simulating, and the modifying actions are adapted to cooperate with a circuit simulation subsystem in an integrated computer aided design tool that performs at least circuit simulation, thermal analysis, and thermal improvement.

15. The method of claim 1, wherein the manipulating, the acts of simulating, and the modifying actions are adapted to cooperate with a plurality of computer aided design subsystems in an integrated computer aided design tool adapted for use in design flow stages comprising at least: floorplanning, partitioned block analysis, detailed place and route, and repair.

16. The method of claim 15, wherein at least one of the simulating actions is performed by the integrated computer aided design tool at a plurality of the stages.

17. The method of claim 1, wherein the predetermined criteria comprises one or more of:
- reducing temperature in one or more predefined regions;
- increasing temperature in one or more predefined regions;
- moderating temperature variations within one or more predefined regions;
- mitigating heating concentrations predefined as excessive;
- equalizing temperature between predefined regions;
- bringing one or more operating parameters within predetermined limits;
- satisfying one or more predefined assertions; and
- reducing the likelihood of electromigration induced failure.

18. The method of claim 1, wherein the selective modification comprises one or more of:
- a change in a heat generating element;
- a change in a heat conducting element; and
- a change in a heat dissipating element.

19. The method of claim 18, wherein the heat generating element comprises one or more of:
- a transistor;
- a diode;
- a resistor;
- a capacitor;
- an inductor; and
- a wire.

20. The method of claim 18, wherein the heat conducting element comprises one or more of:
- a bond-wire land;
- a solder-bump pad;
- a via;
- a stacked via;
- a via placed to be thermally significant and electrically inconsequential;
- a via coupled to a bond-wire land site;
- a via coupled to a solder-bump pad; and
- an area of metallization.

21. The method of claim 18, wherein the heat dissipating element comprises one or more of:
- a bond-wire land;
- a solder-bump pad;
- a via;
- a stacked via;
- a via placed to be thermally significant and electrically inconsequential;
- a via coupled to a bond-wire land site;
- a via coupled to a solder-bump pad; and
- an area of metallization.

22. The method of claim 18, wherein the design database has an associated circuit design and the selective modification comprises one or more of:
- a change of component sizing in at least one part of the circuit design;
- an exchange of circuitry of equivalent logical function in at least one part of the circuit design;
- a change in circuit topology in at least one part of the circuit design; and
- a change in layout of at least one part of the circuit design.

23. The method of claim 22, wherein the change of component sizing comprises resizing one or more transistors.

24. The method of claim 22, wherein the selective modification equalizes the temperature between predefined regions.

25. The method of claim 24, wherein the predefined regions are associated with a first transistor and a second transistor.

26. The method of claim 1, wherein the selective modification comprises selection from design resources differentiated by their thermal conductance but otherwise functionally interchangeable.

27. The method of claim 1, wherein the design database is adapted to a fabrication process having at least one process step that permits at least some regions on at least one layer to be a selected one of a plurality of metallization types having respectively different elemental compositions.

28. The method of claim 27, wherein more than one elemental composition is available for fabricating vias through at least one predetermined dielectric layer.

29. The method of claim 28, wherein each via through the at least one predetermined dielectric layer is a selected one of a plurality of types having respectively different heat transfer and ohmic characteristics.

30. The method of claim 27, wherein one of the metallization types is preferentially used to build one or more vias having enhanced heat conduction.

31. The method of claim 27, wherein one of the metallization types is preferentially used to improve the heat transfer characteristics of one or more wires.

32. The method of claim 27, wherein more than one elemental composition is available for fabricating wires on at least one predetermined metal layer.

33. The method of claim 32, wherein each wire on the at least one predetermined metal layer is a selected one of a plurality of types having respectively different heat transfer and ohmic characteristics.

34. The method of claim 27, wherein one of the metallization types has a higher thermal conductance and lower electrical resistivity than the other metallization types.

35. The method of claim 27, wherein one of the metallization types is preferentially used to raise the temperature in one or more selected regions.

36. The method of claim 27, wherein one of the metallization types comprises the element Ti.

37. The method of claim 1, wherein the selective modification comprises modification of configuration of one or more of:
- circuit design;
- layout;
- chip partitioning;
- chip floorplanning;
- chip place and route;
- chip interconnect;
- chip metallization;
- chip vias between interconnect layers;
- power distribution;
- clock distribution;
- I/O pad locations;
- die-to-package attachment;
- package design; and
- heat dissipater design.

38. The method of claim 37, wherein the modification of configuration comprises one or more of:

a change in size;
a change in number;
a change in placement;
an exchange of placement;
a change in topology;
a change in orientation;
a change in pattern;
a change in geometry;
a change in arrangement;
a change in distribution;
a change in at least one group property;
a change in at least one material property; and
a change in elemental composition.

39. The method of claim 38, wherein at least one instance of the change in number comprises one of:
a change from zero to greater than zero; and
a change from greater than zero to zero.

40. The method of claim 1, wherein the operational temperature distribution simulating is performed by a thermal analysis computer aided design subsystem and the operational electrical performance simulating is performed by at least one other computer aided design subsystem.

41. The method of claim 40, wherein the at least one other computer aided design subsystem is enabled to perform one or more of:
circuit simulation;
floorplanning;
place and route;
static timing analysis;
statistical timing analysis;
power analysis;
signal integrity analysis;
electrical circuit rule checking;
IR drop analysis;
electromigration analysis;
reliability analysis;
power rail analysis; and
clock tree analysis.

42. A system for computer-aided-design of integrated circuits, the system comprising:
a computing platform including processor, memory, and I/O;
a physical design subsystem adapted to manipulate a design database representing at least a portion of a chip having an associated physical structure, operational temperature distribution, and operational electrical performance;
a thermal analysis subsystem adapted to simulate the operational temperature distribution of at least part of the chip using thermal modeling of all thermally significant features of the physical structure, the thermally significant features comprising active devices of a die and embedded multi-layer interconnect of the die and being described by the design database;
an electrical analysis subsystem adapted to simulate the operational electrical performance of the at least part of the chip;
an analysis communication subsystem adapted to programmatically communicate information between the thermal and the electrical analysis subsystems; and
a thermal improvement subsystem adapted to selectively modify aspects of the design database based on the simulated operational temperature distribution and the simulated operational electrical performance in accordance with at least one predetermined criteria.

43. The system of claim 42, wherein the thermal modeling is performed in three dimensions and the temperature distribution is simulated in three dimensions.

44. The system of claim 42, wherein the predetermined criteria comprises one or more of:
reducing temperature in one or more predefined regions;
increasing temperature in one or more predefined regions;
equalizing temperature between predefined regions;
bringing one or more operating parameters within predetermined limits;
satisfying one or more predefined assertions; and
reducing the likelihood of electromigration induced failure.

45. The system of claim 42, wherein the selective modification is performed at least in part to alter the temperature distribution.

46. The system of claim 42, wherein the selective modification is performed at least in part to optimize at least portions of the design database in view of the temperature distribution.

47. The system of claim 42, wherein the selective modification improves one or more of:
the temperature distribution; chip performance; static power; dynamic power; maximum temperature; leakage; and chip reliability.

48. The system of claim 42, wherein the selective modification comprises modification of configuration of one or more of:
chip partitioning;
chip floorplanning;
chip place and route;
chip interconnect;
chip metallization;
chip vias between interconnect layers;
power distribution;
clock distribution;
I/O pad locations;
die-to-package attachment;
package design; and
heat dissipater design.

49. The system of claim 48, wherein the modification of configuration comprises one or more of:
a change in size;
a change in number;
a change in placement;
an exchange of placement;
a change in topology;
a change in orientation;
a change in pattern;
a change in geometry;
a change in arrangement;
a change in distribution;
a change in at least one group property;
a change in at least one material property; and
a change in elemental composition.

50. The system of claim 42, wherein the simulation of the operational electrical performance comprises one or more of:
circuit simulation;
floorplanning;
place and route;
static timing analysis;
statistical timing analysis;
power analysis;
signal integrity analysis;
electrical circuit rule checking;
IR drop analysis;
electromigration analysis;
reliability analysis;

power rail analysis; and
clock tree analysis.

51. The system of claim 42, wherein the selective modification comprises one or more of:
a change in package interconnect;
a change in package metallization;
a change in package vias
a change in integral heat spreader number;
a change in placement of at least one integral heat spreader;
a change in integral heat spreader density in at least one region;
a change in arrangement of a plurality of integral heat spreaders in at least one region;
a change in elemental composition of at least one integral heat spreader;
a change in integral thermal slug number;
a change in placement of at least one integral thermal slug;
a change in integral thermal slug density in at least one region;
a change in arrangement of a plurality of integral thermal slugs in at least one region;
a change in elemental composition of at least one integral thermal slug;
a change in integral heat pipe number;
a change in placement of at least one integral heat pipe;
a change in integral heat pipe density in at least one region;
a change in arrangement of a plurality of integral heat pipes in at least one region;
a change in elemental composition of at least one integral heat pipe;
a change in integral heat sink fin number;
a change in placement of at least one integral heat sink fin;
a change in integral heat sink fin orientation in at least one region;
a change in integral heat sink fin pattern in at least one region;
a change in integral heat sink fin geometry in at least one region;
a change in height of at least one integral heat sink fin;
a change in integral heat sink fin density in at least one region;
a change in arrangement of a plurality of integral heat sink fins in at least one region; and
a change in elemental composition of at least one integral heat sink fin.

52. The system of claim 42, wherein the selective modification comprises one or more of:
a change in solder bump number;
a change in placement of at least one solder bump;
a change in solder bump density in at least one region;
a change in arrangement of a plurality of solder bumps in at least one region;
a change in elemental composition of at least one solder bump;
a change in application of underfill in at least one region;
a change in elemental composition of underfill in at least one region;
a change in final metal attachment pad number;
a change in placement of at least one final metal attachment pad;
a change in final metal attachment pad density in at least one region;
a change in arrangement of a plurality of final metal attachment pads in at least one region; and
a change in elemental composition of at least one final metal attachment pad.

53. An article of manufacture comprising a computer readable medium having stored therein a computer program component adapted to semiconductor computer-aided-design, the computer program component comprising:
a first code segment, which when executed on a computer, is adapted to manipulate a design database representing at least a portion of a chip having an associated physical structure, operational temperature distribution, and operational electrical performance;
a second code segment, which when executed on the computer, simulates the operational temperature distribution of at least part of the chip using thermal modeling of all thermally significant features of the physical structure, the thermally significant features comprising active devices of a die and embedded multi-layer interconnect of the die and being described by the design database;
a third code segment, which when executed on the computer, simulates the operational electrical performance of the at least part of the chip;
a fourth code segment, which when executed on the computer, programmatically communicates information between the acts of simulating; and
a fifth code segment, which when executed on the computer, selectively modifies aspects of the design database based on the simulated temperature distribution and the simulated operational electrical performance in accordance with at least one predetermined criteria.

54. The article of manufacture of claim 53, wherein the thermal modeling is performed in three dimensions and the temperature distribution is simulated in three dimensions.

55. The article of manufacture of claim 53, wherein the selective modification is performed at least in part to alter the temperature distribution.

56. The article of manufacture of claim 53, wherein the selective modification is performed at least in part to optimize at least portions of the design database in view of the temperature distribution.

57. The article of manufacture of claim 53, wherein the predetermined criteria comprises one or more of:
reducing temperature in one or more predefined regions;
increasing temperature in one or more predefined regions;
equalizing temperature between predefined regions;
bringing one or more operating parameters within predetermined limits;
satisfying one or more predefined assertions; and
reducing the likelihood of electromigration induced failure.

58. The article of manufacture of claim 53, wherein the selective modification improves one or more of: the temperature distribution; chip performance; static power; dynamic power; maximum temperature; leakage; and chip reliability.

59. The article of manufacture of claim 53, wherein the modified selected aspects comprise modification of configuration of one or more of:
chip partitioning;
chip floorplanning;
chip place and route;
chip interconnect;
chip metallization;
chip vias between interconnect layers;
die-to-package attachment;
package design; and
heat dissipater design.

60. The article of manufacture of claim 59, wherein the modification of configuration comprises one or more of:
a change in size;
a change in number;

a change in placement;
an exchange of placement;
a change in topology;
a change in orientation;
a change in pattern;
a change in geometry;
a change in arrangement;
a change in distribution;
a change in at least one group property;
a change in at least one material property; and
a change in elemental composition.

61. The article of manufacture of claim 59, wherein the modification of configuration of the chip interconnect comprises one or more of:
   a change in wire routing;
   a change in width of one or more wires;
   a change in resistivity of one or more wires; and
   a change in elemental composition of one or more wires.

62. The article of manufacture of claim 59, wherein the modification of configuration of the chip metallization comprises one or more of:
   a change in location;
   a change in patterning in at least one region;
   a change in cross section in at least one region;
   a change in thickness in at least one region;
   a change in elemental composition in at least one region;
   a change in at least one material property in at least one region;
   a change in tile arrangement in at least one region; and
   a change in tile density in at least one region.

63. The article of manufacture of claim 62, wherein the chip metallization comprises one or more of:
   vias;
   wires;
   metal fills; and
   final metal attachment pads.

64. The article of manufacture of claim 63, wherein one or more of density and location of the metal fills is modified to achieve a desired thermal result.

65. The article of manufacture of claim 63, wherein one or more of density and location of the final metal attachment pads is modified to achieve a desired thermal result.

66. The article of manufacture of claim 63, wherein the final metal attachment pads comprises lands on top of which solder bumps are placed.

67. The article of manufacture of claim 66, wherein the solder bumps are compatible with a controlled collapse chip connection (C4) process.

68. The article of manufacture of claim 66, wherein the final metal attachment pads are of a metal 8 layer.

69. The article of manufacture of claim 63, wherein the final metal attachment pads comprise wire bonds pads.

70. The article of manufacture of claim 63, wherein the metal fills are implemented using a plurality of metal tiles.

71. The article of manufacture of claim 59, wherein the modification of configuration of the chip vias between interconnect layers comprises one or more of:
   a change in via number;
   a change in placement of at least one via;
   a change in via density in at least one region;
   a change in arrangement of a plurality of vias in at least one region;
   a change in cross section of one or more vias;
   a change in resistivity of one or more vias; and
   a change in elemental composition of one or more vias.

72. The article of manufacture of claim 59, wherein the die-to-package attachment comprises one or more of:
   solder bumps;
   underfill; and
   final metal attachment pads.

73. The article of manufacture of claim 59, wherein the modification of configuration of the die-to-package attachment comprises one or more of:
   a change in solder bump number;
   a change in placement of at least one solder bump;
   a change in solder bump density in at least one region;
   a change in arrangement of a plurality of solder bumps in at least one region;
   a change in elemental composition of at least one solder bump;
   a change in application of underfill in at least one region;
   a change in elemental composition of underfill in at least one region;
   a change in final metal attachment pad number;
   a change in placement of at least one final metal attachment pad;
   a change in final metal attachment pad density in at least one region;
   a change in arrangement of a plurality of final metal attachment pads in at least one region; and
   a change in elemental composition of at least one final metal attachment pad.

74. The article of manufacture of claim 59, wherein the modification of configuration of the package design comprises one or more of:
   a change in package interconnect;
   a change in package metallization;
   a change in package vias
   a change in integral heat spreader number;
   a change in placement of at least one integral heat spreader;
   a change in integral heat spreader density in at least one region;
   a change in arrangement of a plurality of integral heat spreaders in at least one region;
   a change in elemental composition of at least one integral heat spreader;
   a change in integral thermal slug number;
   a change in placement of at least one integral thermal slug;
   a change in integral thermal slug density in at least one region;
   a change in arrangement of a plurality of integral thermal slugs in at least one region;
   a change in elemental composition of at least one integral thermal slug;
   a change in integral heat pipe number;
   a change in placement of at least one integral heat pipe;
   a change in integral heat pipe density in at least one region;
   a change in arrangement of a plurality of integral heat pipes in at least one region;
   a change in elemental composition of at least one integral heat pipe;
   a change in integral heat sink fin number;
   a change in placement of at least one integral heat sink fin;
   a change in integral heat sink fin orientation in at least one region;
   a change in integral heat sink fin pattern in at least one region;
   a change in integral heat sink fin geometry in at least one region;
   a change in height of at least one integral heat sink fin;
   a change in integral heat sink fin density in at least one region;
   a change in arrangement of a plurality of integral heat sink fins in at least one region; and a change in elemental composition of at least one integral heat sink fin.

75. The article of manufacture of claim 59, wherein the modification of configuration of the heat dissipater design comprises one or more of:
   a change in heat sink fin number;
   a change in placement of at least one heat sink fin;
   a change in heat sink fin orientation in at least one region;
   a change in heat sink fin pattern in at least one region;
   a change in heat sink fin geometry in at least one region;
   a change in height of at least one heat sink fin;
   a change in heat sink fin density in at least one region;
   a change in arrangement of a plurality of heat sink fins in at least one region; and
   a change in elemental composition of at least one heat sink fin.

76. The article of manufacture of claim 53, wherein the simulation of the operational electrical performance comprises one or more of:
   circuit simulation;
   floorplanning;
   place and route;
   static timing analysis;
   statistical timing analysis;
   power analysis;
   signal integrity analysis;
   electrical circuit rule checking;
   IR drop analysis;
   electromigration analysis;
   reliability analysis;
   power rail analysis; and
   clock tree analysis.

77. The article of manufacture of claim 53, wherein the simulation of the operational electrical performance is used in at least one stage in an overall design flow, and the at least one stage comprises one or more of:
   circuit design;
   circuit simulation;
   simulation;
   floorplanning;
   place and route;
   block partitioning;
   detailed place and route;
   engineering change order; and
   sign-off.

* * * * *